United States Patent
Burgin et al.

(10) Patent No.: US 10,803,765 B2
(45) Date of Patent: Oct. 13, 2020

(54) DISPLAY AND REPORT GENERATION PLATFORM FOR TESTING RESULTS

(71) Applicant: Knowledge Factor, Inc., Boulder, CO (US)

(72) Inventors: Robert Burgin, Boulder, CO (US); Nicholas Hjort, Parker, CO (US); Charles J. Smith, Encinitas, CA (US)

(73) Assignee: Knowledge Factor, Inc., Boulder, CO (US)

( * ) Notice: Subject to any disclaimer, the term of this patent is extended or adjusted under 35 U.S.C. 154(b) by 364 days.

(21) Appl. No.: 15/853,104

(22) Filed: Dec. 22, 2017

(65) Prior Publication Data
US 2019/0197912 A1    Jun. 27, 2019

(51) Int. Cl.
| | | |
|---|---|---|
| *G09B 7/077* | (2006.01) | |
| *G09B 7/08* | (2006.01) | |
| *G09B 5/02* | (2006.01) | |
| *G09B 5/06* | (2006.01) | |
| G06F 3/0482 | (2013.01) | |
| G06F 3/0484 | (2013.01) | |
| G06F 16/25 | (2019.01) | |

(52) U.S. Cl.
CPC ............ *G09B 7/077* (2013.01); *G09B 5/02* (2013.01); *G09B 5/06* (2013.01); *G09B 7/08* (2013.01); *G06F 3/0482* (2013.01); *G06F 3/04842* (2013.01); *G06F 16/254* (2019.01)

(58) Field of Classification Search
CPC . G09B 7/00; G09B 7/06; G09B 7/077; G09B 7/08
See application file for complete search history.

(56) References Cited

U.S. PATENT DOCUMENTS

| | | | |
|---|---|---|---|
| 9,530,329 B2 * | 12/2016 | Rudolph | G09B 7/00 |
| 10,410,534 B2 * | 9/2019 | Robertson | G06Q 10/06 |
| 2009/0035733 A1 | 2/2009 | Meitar et al. | |
| 2012/0288845 A1 * | 11/2012 | Kumar | G09B 7/06 434/362 |
| 2015/0187225 A1 | 7/2015 | Worsley | |

OTHER PUBLICATIONS

Young, Lee, "International Search Report and Written Opinion Regarding International Application No. PCT/US2018/67147", dated Mar. 28, 2019, p. 10 Published in: US.

* cited by examiner

*Primary Examiner* — James S. McClellan
(74) *Attorney, Agent, or Firm* — Neugeboren O'Dowd PC

(57) ABSTRACT

A data collection, display, and report generation platform has a first input interface configured to present a learning module comprising a series of questions and answers on a plurality of successive question/answer screens comprising a plurality of radio buttons, at least one of the radio buttons configured to accept both a first input action and a subsequent second input action, each providing a different visual indication. The first and second input action each indicate a different confidence level of a learner's answer. A display dashboard displays a plurality of data visualizations of metrics of misinformation and struggle of plurality of learners based on a plurality of answers collected through the first input interface, and comprises one or more bar graph displays, one or more heat map displays, and one or more sorting tools configured to alter the one or more bar graph displays or one or more heat map displays.

20 Claims, 23 Drawing Sheets

FIG. 7

700 question feedback

Here you can give feedback about the question

○ I'd like to share a relevant experience      ○ There is new evidence
○ I disagree with the answer                    ○ Other Type your comments here (500 character limit)

Note: please contact support for any platform issues.

submit    cancel

DISPLAY AND REPORT GENERATION PLATFORM FOR TESTING RESULTS

FIELD OF THE DISCLOSURE

Aspects of the present disclosure relate to a display and report generation platform for organizational test results. In particular, but without limitation, aspects of the present disclosure relate to visual displays for easily identifying the most relevant data gathered from the results of administered computerized tests, and the automatic generation of data reports and summaries therefrom.

BACKGROUND

In the field of computerized organizational testing and training, there have been many advancements in how to improve the learning, retaining, and mastering of bodies of information by individuals within a large organization. As computerized testing and training systems have advanced, various aspects of both testing and training have become more effective due in large part to these systems being able to provide customizable testing and training based on each individual learner's needs. It is well known that individuals each have different learning styles, abilities, and existing states of knowledge on any particular subject. It is also known that taking such differences into account for each individual can improve rates of learning, retaining, and mastering information. Various educational techniques have been proven in studies to enhance the learning, retaining, and mastering of information, but the more such techniques can be customized to each individual, the more effective the techniques can be. When there are multiple individuals for whom techniques need to be customized, the number of possible iterations of tests and training becomes exponentially large very quickly.

Many organizations require dozens, hundreds, or thousands of individual learners to learn similar material. Schools, healthcare organizations, governmental organizations, private commercial enterprises, and the like, often require that a large number of learners be trained and tested across various time periods and geographical locations. Advanced computerized testing systems for such environments provide this capability by implementing large centralized databases of learning material as well as algorithms for delivering customized content from these databases over distributed networks.

As these computerized testing systems advance and become capable of delivering more customized material to more learners, organizations are using such systems more and more. As a result, individual learners who are the subjects of these tests often desire greater efficiency in both the test-taking process and the learning process in order to reduce the time spent on each. Opportunities exist for the various educational techniques that enhance learning to be implemented in more intuitive, user-friendly, and efficient ways on a graphical user interface.

Another challenge that exists in this field is that because so many learners can be tested and trained, and because each of the tests can be customized and contain many data points, the volume of data generated from the tests can be extremely large. Valuable information can be gleaned from such data but it is often cumbersome to manipulate that data and derive anything useful. Therefore, opportunities exist to report and display learner data to test administrators in new and useful ways.

SUMMARY

One aspect of the disclosure provides a data collection, display, and report generation platform comprising a first input interface configured to present a learning module. The learning module may comprise a series of questions and answers on a plurality of successive question/answer screens of the first input interface. At least one of the successive question/answer screens may be presented based on answers on a previous question/answer screen, and at least one of the plurality of successive screens may comprise a plurality of radio buttons. Each of the plurality of radio buttons may be associated with an answer to a question, and at least one of the radio buttons may be configured to accept both a first input action alone and the first input action and a subsequent second input action. The first input action causes the at least one of the radio buttons to provide a first visual indication of the first input action, and the subsequent second input action causes the at least one of the radio buttons to provide a second visual indication of the second input action. The first input action and the second input action may each indicate a different confidence level of a learner's answer. The platform may also comprise a display dashboard configured to display a plurality of data visualizations of metrics of misinformation and struggle of plurality of learners on one or more interactive screens based on a plurality of answers collected through the first input interface. The display dashboard may comprise one or more bar graph displays, one or more heat map displays, and one or more sorting tools configured to alter the one or more bar graph displays or one or more heat map displays.

Another aspect of the disclosure provides a data collection, display, and report generation platform comprising a first input interface configured to present a learning module. The learning module may comprise a series of questions and answers on a plurality of successive question/answer screens of the first input interface. At least one of the successive question/answer screens may be presented based on answers to a previous question/answer screen, and at least one of the plurality of successive screens may comprise a plurality of radio buttons. Each of the plurality of radio buttons may be associated with an answer to a question, and at least one of the radio buttons may be configured to accept both a first input action alone and the first input action and a subsequent second input action. The first input action causes the at least one of the radio buttons to provide a first visual indication of the first input action, and the subsequent second input action causes the at least one of the radio buttons to provide a second visual indication of the second input action. The first input action and the second input action may each indicate a different confidence level of a learner's answer. The platform may further comprise a learner dashboard configured to display a plurality of data visualizations of metrics of module and course progress of a learner on one or more interactive screens based on a plurality of answers collected through the first input interface. The learner dashboard may be configured to display a first circular graph indicating module progress, a second circular graph indicating course progress, a time-spent bar graph comparing time spent by a learner to other learners, and an estimated time of completion.

BRIEF DESCRIPTION OF THE DRAWINGS

FIG. 7 shows a question feedback input interface of the present disclosure.

FIG. 14 shows a lower portion list view of the learner progress administrator dashboard of FIG. 13.

FIG. 20 shows an actionable analytics report view generated by the system of the present disclosure.

DETAILED DESCRIPTION

Figure 1:
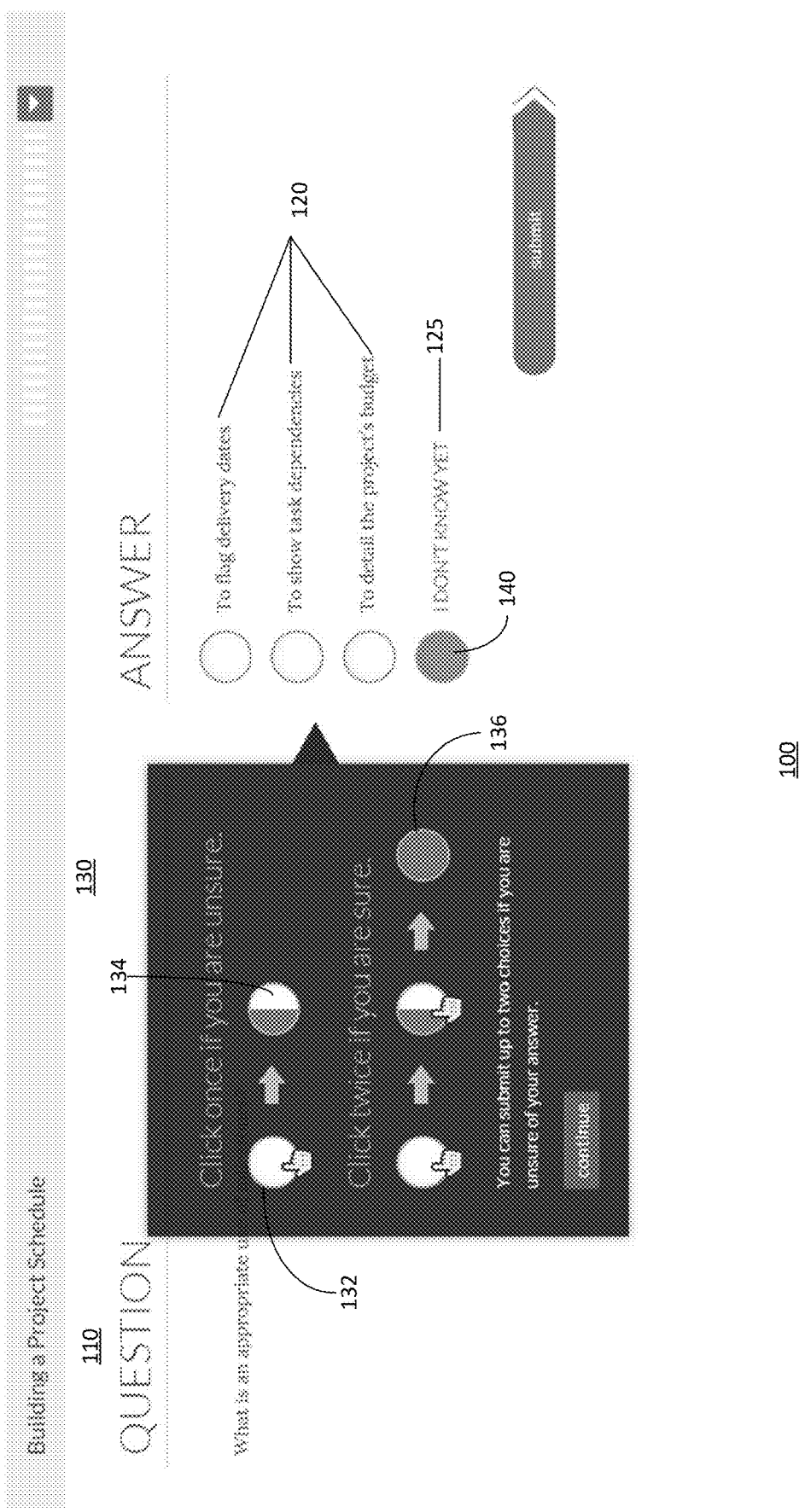
FIG. 1 shows an exemplary question-and-answer input interface of the present disclosure.

A first part of the disclosure relates to user interface displays that facilitate the collection of learner input, increase learner engagement, increase learner information retention, and speed the learning and testing process. The learning systems described herein pertain to learning courses (which may be referred to as tests or assessments) that implement two-dimensional multiple choice question and answer sets (which may also be referred to simply as "two-dimensional questions"). The two dimensions refer to 1) a substantive answer and 2) a confidence level the learner has that the substantive answer is correct. For each multiple choice question, the selection of an answer is either substantively correct or substantively incorrect. For each substantive answer a learner chooses, a learner's confidence level can be either sure or unsure. As a result, four two-dimensional answers are possible; sure (confident) and correct; sure (confident) and incorrect; unsure and correct; and unsure and incorrect.

Organizations can make different value judgments on the importance of a learner's confidence in a correct or incorrect answer, but generally, it is possible to categorize the different types of answers as levels of knowledge. The following paragraph describes one system of categorizing a learner's "knowledge state" as a function of the learner's substantive answer, level of confidence (if asked), and number of times a learner has responded in a particular way. In the present system of categorization, when a learner answers a question confidently and correctly once, that learner can be designated as having "proficient" substantive knowledge. When a learner answers the same or similar question confidently and correctly twice or more times, the learner can be designated as having "mastery" over the substantive knowledge. When a learner answers a question correctly but is unsure, the learner can be designated as having an "informed" knowledge state. The learner may need to be asked the question again later to determine whether the learner has moved into a proficient state. An unsure and incorrect answer may result in the designation of an "uninformed" knowledge state. A confident and incorrect may result in the designation of a "misinformed" knowledge state. This knowledge state may also be referred to as a learner having "confidently held misinformation" throughout the disclosure in order to highlight significant impacts of this knowledge state within the testing and training systems of organizations. Some or all of these identified knowledge states may be used in the reporting and display systems of the present disclosure.

In the system of the present disclosure, some two-dimensional question and answer sets may comprise one one-dimensional answer option that is simply "I don't know." Such answers indicate a "not sure" knowledge state, which may be considered slightly different from an "informed" or "uninformed" knowledge state from a pedagogical standpoint. Such differentiation may be valuable to a test administrator for the purposes of facilitating learning. In sum, the different knowledge states assigned to learners as a result of their answers in the system of the present disclosure may be categorized as follows:

1) Sure and correct two or more times: Mastery
2) Sure and correct once: Proficiency (or Mastery if on the first try)
3) Unsure and correct: Informed
4) Unsure and incorrect: Uninformed
5) Sure and incorrect: Misinformed (or having confidently held misinformation)
6) "I don't know" one-dimensional answer: Not sure In order to simply the manner in which these knowledge states are reported, the categories may be simplified into three knowledge states, comprising "Mastery" for any number of sure and correct answer, "Uncertainty" for any indication by the learner of being unsure or not knowing, and "Misinformation" for any sure and incorrect answer.

An aspect of the present disclosure pertains to facilitating the efficient capturing of a learner's one or two-dimensional answers. FIG. 1 shows an exemplary question-and-answer graphical user interface display 100 (also referred to herein as an "input interface" on a computer screen. The features shown and described throughout FIGS. 1-7 are all part of a single "module" of testing and learning material. In general, a module comprises several distinct learning and testing topics (also referred to as "objects"). Each of these topics comprises several questions about the topic, each of which may be displayed or worded differently than other questions about the same topic. The object also comprises learning material (e.g., an explanation, video, graphic, or other information) about the correct and incorrect answers to the questions.

In FIG. 1, a question 110 is displayed on the left side of the screen and four potential answers are displayed on the right. Of the four potential answers, the top three are two-dimensional answers 120, and one one-dimensional answer 125 of "I don't know yet." The "I don't know yet" option exists because the questions in the module being presented in FIG. 1 implement a technique known as "priming." This feature asks "priming" questions of a learner even before presenting any learning material. Education research has shown that asking questions of a learner, even if the learner has no prior knowledge of a particular subject, primes the brain for receiving and retaining information when the learning material is later presented. The learner can select the one-dimensional answer in this mode in order to speed the learning and testing process, which will be described in more detail later in this disclosure.

The input interface 100 also comprises a pop-up instruction box 130, which appears when a learner first clicks on any of the one or two-dimensional answers 120, 125. Many users of computerized testing systems are accustomed to clicking on one-dimensional answer choices to multiple-choice questions, but many may be unfamiliar with systems that receive both substantive answers and confidence levels. There are a number of possible ways a user could select both a substantive answer and a confidence level, which have been implemented in prior systems with graphical user interfaces. For example, a user could select a substantive answer out of one column and a confidence level out of another, thereby clicking on two radio buttons to indicate the two dimensions of the answer. As another example, a user could drag and drop substantive answers from one area of a screen into areas of associated with confidence levels on another area of a screen. The answer-receiving functionality and display of the present disclosure provides advantages over these previously implemented methods.

As shown in the pop-up instruction box 130, a user may be presented with one large radio button 132 per answer, which may display different visual indicators based on the number of clicks and the type question with which the radio button is associated. If the radio button is associated with a two-dimensional question, such as questions 120, and the user clicks once, the radio button may display as half-full of color, as shown in the half-full radio button 134. If the use clicks twice, the radio button may display as fully colored-in, as shown in the full-color radio button 136. This feature gives a user a subtle clue that there is more to just the substantive answer when first clicking on it. The second click requires the user to actively confirm that he or she is sure of an answer. An advantage to this click and display system is that a user does not have to draw his or her attention away from a substantive answer and separately think about their confidence level independently of the substantive answer. That is, the user can remain focused on the substantive answer while considering their confidence as a function of clicks. This input mechanism is the simplest kind of input possible into a computer screen, and is beneficial because it is faster and more intuitive than dragging and dropping or clicking on two separate buttons There are particular advantages to the input display and mechanism of the present disclosure over existing methods in the art. By integrating the confidence measurement with the action of selecting a question, the lift a learner gets from assessing confidence is in place. Previous methods have implemented input displays and mechanisms that the ask the learner of his or her confidence after he or she made a selection on the answer (in other words, it is a 2 step process). That method presents a particular problem: when a learner assesses their confidence after a decision is made, the confidence selection does not cause the learner to question their selection or review the other answers as part of the action. The weighing of all the answers is where the learning lift occurs. A learner really has to think about why they chose a particular answer, and why not the others. This increases the priming effect while helping to drive deeper knowledge on the subject by including the wrong answers as part of what is being learned.

For one-dimensional answers, such as the "I don't know yet" answer 125, the radio button may immediately display a fully colored-in button 140 upon being clicked just once, visually indicating to the user that this question only has one dimension and is solely an indication of a knowledge state. This feature allows users to quickly distinguish whether they are done providing a response to a question.

Figure 2:
FIG. 2 shows another question-and-answer input interface display of the present disclosure.
Figure 2:
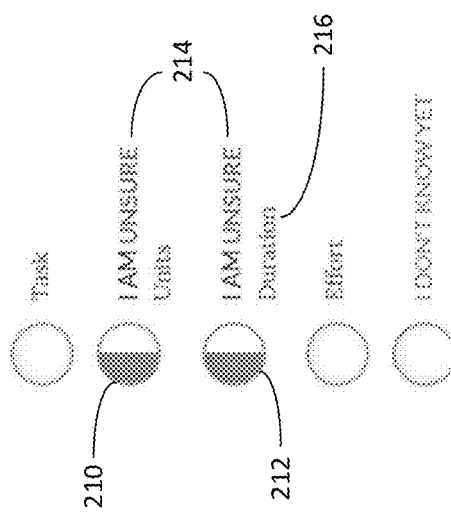
Figure 2:
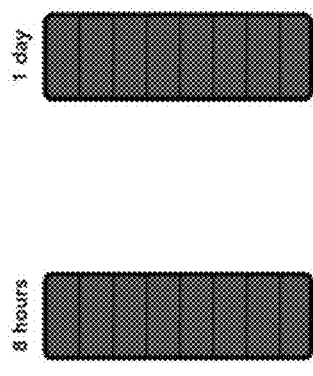

Another feature of this question-and-answer display 100 is shown in FIG. 2. A user may select up to two choices if he or she is unsure of the answer. As shown, if a user has clicked on a two-dimensional answer choice only once, and the radio button 210 is only half colored-in, the user may select another radio button 212 once. In some embodiments, if a user has selected one of the two-dimensional answers as "sure" (e.g., clicked it twice), the other answer choices may be rendered unclickable. This feature ensures that a user cannot mistakenly choose one answer as "sure" and another answer as "unsure" or "sure." If a user does want to select more than one answer, the user has to consciously confirm that he or she is truly unsure of both answers.

Additionally, the question-and-answer display of the present disclosure presents a written confirmation cue of the user's indicated knowledge state by displaying the words "I am unsure" 214 above the displayed substantive answer 216. The combination of the half colored-in radio buttons next to the written words "I am unsure" in response to one click in each radio button, before clicking to submit an answer, gives users a visual, written, and kinesthetic cue to reinforce the acknowledgement of a confidence level. It is known that different learners process visual, written, auditory, and kinesthetic information differently, with one or two types of information being preferable to any particular learner. Having multiple types of cues associated with one piece of information ensures that more people can quickly understand the information presented on an interface.

Figure 3:
FIG. 3 shows exemplary answer graphical displays of the present disclosure.
Figure 3:
Figure 3:
Figure 3:

Within the pre-learning questioning phase, an answer explanation may be immediately presented to a learner after he or she submits a choice or choices. FIG. 3 shows exemplary answer explanation displays 310, 320, 330, and 340. In each of these displays, the answer choice the learner selected is visually marked to indicate both the correctness or incorrectness of the substantive answer and the knowledge state of the learner. In the first display 310, an unsure and correct answer 312 is denoted by a half colored-in radio button with a vertical line down the center and the right half of the circle filled in. In the second display 320, an unsure and incorrect answer 322 is denoted similarly to the unsure and correct answer 312, but it is displayed in a different color. For example, the unsure and correct answer 312 may be green and the unsure and incorrect answer 322 may be red, corresponding to many learner's existing associations of green with a positive result and red with a negative result.

In the third display 330, a sure and incorrect answer 332 is denoted with a large "X," which may be red in embodiments. In the fourth display 340, a sure and correct answer 342 is denoted with a large check mark, which may be green in embodiments. The correct answer is not shown if the learner has selected the incorrect answer, and no supplementary learning information is presented to the learner at this point. Instead, the learner's next step after answering a priming question is simply to move on to the next question. This sequence of events is purposeful, because in the background, an algorithm uses the learner's answers from the priming questions as inputs to create a customized order of repeat and/or related questions within the module (as described previously, a module may present questions that are exactly the same as earlier-presented questions, or it may present differently-worded or arranged questions about earlier-presented subject matter). The order of a learner's answers may be referred to as an "answer sequence" throughout the disclosure. Rather than just answering priming questions, the learner will eventually move on to a phase in the module wherein priming questions will be interspersed with learning material. This algorithm for how various questions are presented will be described in more detail later in the disclosure.

Figure 4A:
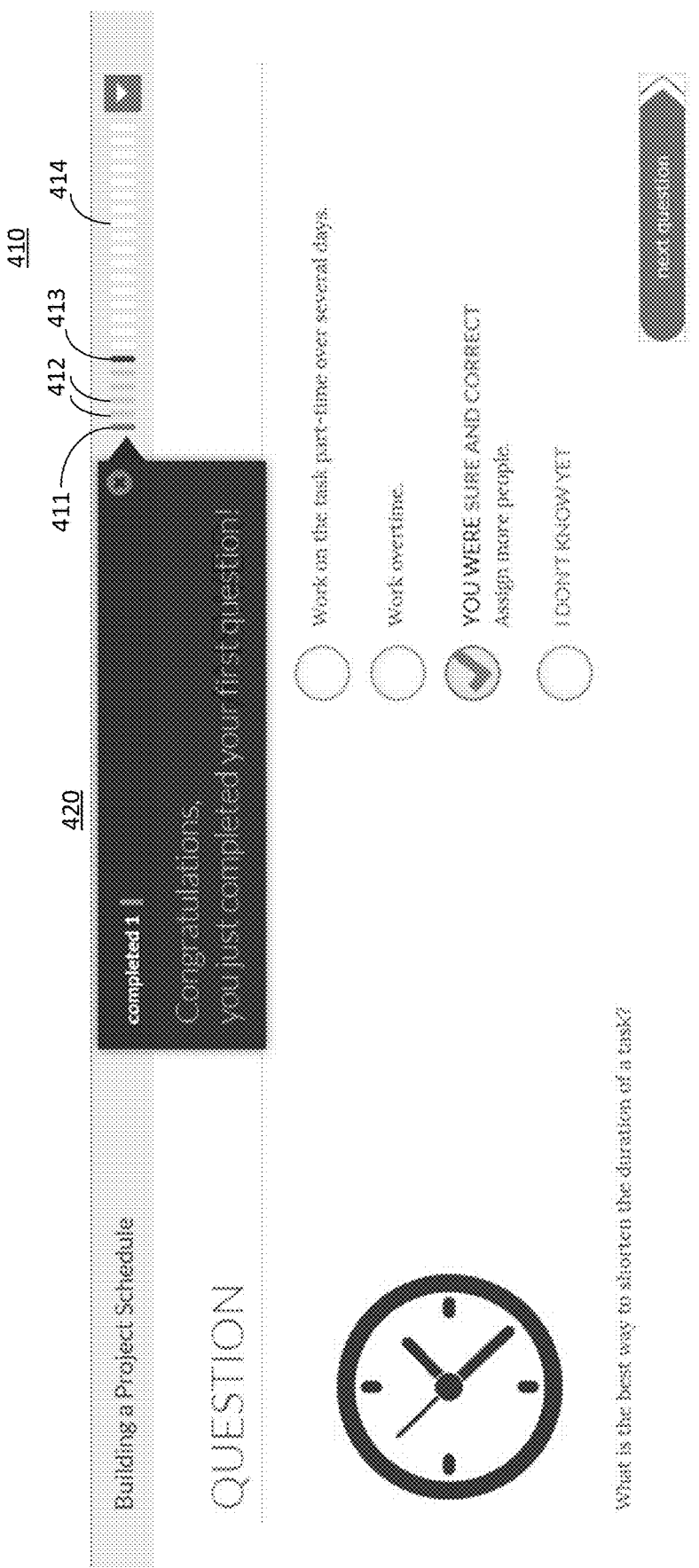
FIG. 4A shows a question-and-answer progress display of the present disclosure.

Another feature of the module algorithm is that if a user answers a question as sure and correct before the learner has seen any learning material within the module, the answer counts as a "mastered" concept, which grants the learner progress toward the completion of the entire module. This feature allows a learner to complete a module more quickly and efficiently if the learner comes in with existing knowledge of the subject matter. A goal of the learning module algorithm is to get the learner to answer questions as sure and correct as quickly as possible. FIG. 4A shows a visual completion bar 410 at the top of the question and answer display 400. The completion bar 400 shows a learner several aspects of their progress so far. As shown, the completion bar 400 comprises several vertical marks representing total concepts that need to be completed within the module. The first vertical mark 411 in this example is filled in completely (e.g., as dark green) to represent that the user has mastered a concept. The dialog box 420 in the figure says that the learner has just completed their first question; in this case, the filled in vertical mark 411 and dialog box 420 indicate that the learner has either 1) answered the question as sure and correct upon first seeing it, or 2) has answered the question sure and correct at least once after previously answering otherwise. There are a number of possible combinations of answers and answer sequences that can lead to a vertical mark being filled in completely. For example, a learner may answer a question any number of times as sure and incorrect, unsure and incorrect, or unsure and correct. Depending on a learner's previous answers, the algorithm may require a learner to answer the same question once or twice as sure and correct. A learner must show mastery over each piece of learning material in a module, which would be represented by each vertical mark in the completion bar 410 being filled in completely.

The completion bar 410 also indicates how much material in the module the learner has made satisfactory progress toward by partially shading other vertical marks. As shown, the partially shaded vertical marks 412 are lighter in shade than the fully shaded vertical mark 411 (e.g., they may be a light green instead of a dark green). These partially shaded marks may indicate that a learner has made some sort of progress, which may comprise one of several possibilities. For example, a learner may have answered a question as unsure and correct one or more times. As another example, a learner may have answered a question as unsure and incorrect once, but then subsequently answered the same question as sure and correct once. Or a learner may have answered as sure and incorrect once, and then unsure and correct once. Several additional combinations of answers and subsequent answers may result in partial shading of marks, but in general, partial shading of marks indicates some sort of positive progress or improvement over a learner's previous knowledge state. Notably, an answer of "I don't know yet" results in a partially shaded mark, and is considered positive progress toward completion of the module. This feature encourages a learner to admit when they truly do not know an answer instead of guessing. The learner is rewarded with a partially-filled in mark and is presented with learning material about the question before being presented with it again. The next time the learner sees the question, if the learner answers as sure and correct once, the mark will be filled in completely.

The completion bar 410 also indicates how much material a learner has answered incorrectly and on which he or she has not yet made positive progress via a differently-colored vertical mark 413 on the right of the partially-shaded marks 412. In some embodiments, this differently-colored vertical mark 413 may be red. The mark 413 may indicate some sort of negative result; for example, that a learner has answered a question as unsure and incorrect once or more time, or sure and incorrect once or more times. Such answer sequences may be characterized as negative results of "misinformation" or "struggle," which will be discussed in greater detail later in the disclosure. Upon answering another question on the same subject matter correctly later, the red mark may change to a light green mark, and upon sufficient sure and correct answers to the same subject matter (e.g., one or two), the light green mark may change to dark green.

Subject matter not yet seen by a learner in a particular module is represented with blank vertical marks 414 that have yet to be presented to the learner. These blank vertical marks 414 will be filled in as described above with dark green, light green, and red marks as the learner progresses. Another feature of the progress bar 414 is that the dark green marks 411 will be accumulated from left to right, the light green marks 412 will be filled in to the right of the dark green marks 411, and the red marks 413 will be filled in on the right of the light green marks 413. Any of the vertical marks of any color may be added or changed in response to a learner's answers.

The completion bar method and display therefore provides a number of advantages to a learner. First, it provides a way for a learner to visualize how much total module progress he or she has made and how much remains. Providing a reliable visual indicator of progress has been difficult in prior confidence-based testing platforms because the absolute number of questions varies for each learner based on the learner's pattern of answers. In the display of the present disclosure, the total number of subject matter concepts in a module is represented by the vertical hash marks, and they are adapted to reflect progress no matter how many total questions the learner actually ends up answering. A second advantage is that it provides a way for learners to visualize the quality of their progress. That is, a user can see a difference in progress made on the completion bar 410 between rushing through questions and perhaps answering many of them incorrectly or with inaccurate confidence assessments, and carefully evaluating their knowledge state. The difference becomes apparent when a user sees either the light green and subsequently dark green vertical marks increase, or the red marks increase. A third advantage is that it allows the user to visually identify the efficiency of their learning. It does not take long for a new learner to the system to associate increased red marks with increased time required to complete the module. This display method therefore teaches a learner very quickly (even one who is unfamiliar with the system of confidence-based learning) the importance of accurately assessing their own knowledge state.

Figures 4B, 4C:
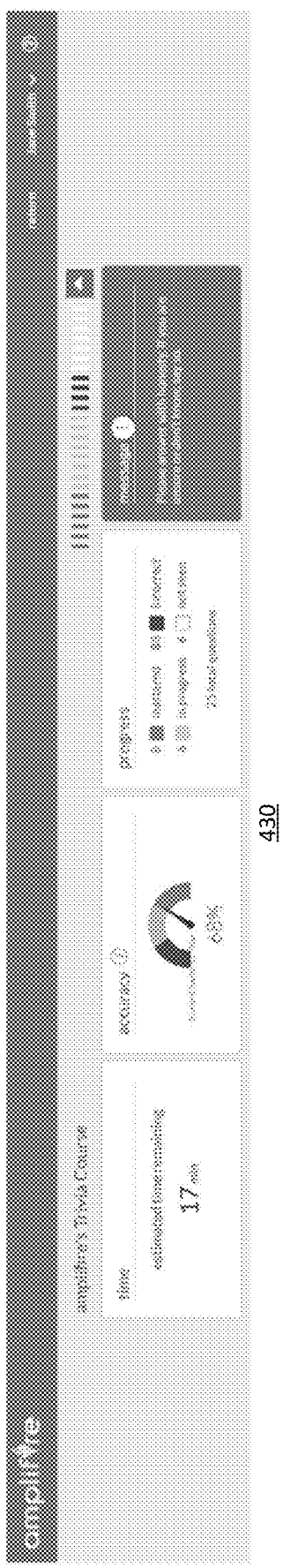
FIG. 4B shows a prompt given through an artificial intelligence-based guidance system of the present disclosure.
FIG. 4C shows another example of a prompt given through an artificial intelligence-based guidance system of the present disclosure.

FIG. 4A also shows a feature associated with another aspect of the disclosure, which is an artificial intelligence (AI)-based learner guidance system. In FIG. 4A, a dialog box 420 is displayed to a learner after completing a first question to draw the learner's attention to the completion bar 410. This feature assists the learner by guiding him or her on tips to complete the test more efficiently. FIGS. 4B and 4C show other exemplary prompts in dialog boxes 430 and 440. The dialog box 430 displays a message saying "Please answer with honesty. if you are unsure or don't know, say so." This prompt is based on an algorithm that associates particular phrases with learner answer sequences. For example, the prompt in dialog box 430 may be shown in response to a learner getting several answers in a row "sure and incorrect". Such prompts may be programmed to appear because certain patterns indicate that something can be reasoned from the pattern. In this case, the chances that a learner is really sure and correct for too many questions in a row likely indicates that the learner is not being truthful about his or her knowledge state. For the prompt in dialog box 440, which says "you have been doing great in this module, keep it up . . . ," such a prompt may be in response to a learned pattern by the guidance system algorithm that shows that learners at this particular point in the module likely need encouragement to finish in a timely manner.

A range of prompts can be used within the AI guidance system, which mimics an intelligent response that an instructor might give if the instructor were familiar with each answer and knowledge state given by the learner in real time. These prompts can be used to discourage "cheating" when cheating patterns are detected. In many embodiments of the learning system, a learner is subject to a "penalty" of having to answer a question twice as "sure and correct" after getting an answer "sure and incorrect" or selecting two answers as "unsure." A learner may become aware of this time penalty and try to "cheat" to save time. In this learning system, "cheating" may be defined as a user expressly trying to avoid the penalty." For example, one way to cheat is to answer "I don't know" or "unsure on just one answer" to all the questions, write down the answers as they appear, and answer them correctly the next time through without actually learning. Since the point of the learning system is for users to assess their knowledge states correctly and actually learn, prompts may appear upon the detection of cheating patterns that say "accurately estimating your confidence helps your memory and saves you time. You'll spend extra time where you're confident and wrong." Other prompts may be generated and displayed to users in response to detected answer patterns that show that a learner is very smart, has great metacognition, has poor metacognition, or has high levels of confidently held misinformation. Other prompts that encourage a learner to stay on task or to improve may be used in various embodiments. The timing of when each of these prompts will be personalized to each learner, since each individual learner can have a different question and answer sequence while proceeding through the modules. Having a uniquely-tailored AI guidance system that responds to learners as they need particular prompts further enhances the effectiveness of teaching concepts to learners of all types.

Figure 5:
FIG. 5 shows an exemplary learning materials display interface of the present disclosure.

Turning now to FIG. 5, shown is a learning display 500 of the present disclosure in which learning material 510 is displayed under a question-and-answer review section 520. The system of the present disclosure automatically presents learning material in this manner after a certain number of administered questions; in some embodiments, this learning material is presented after the learner has answered five to ten questions. This learning material, however, is only presented to a learner for questions to which the learner has recently answered "I don't know yet" or incorrectly. As shown in the question-and-answer review section 520, the learner had answered the question as "sure and incorrect." In different display sections of the computerized testing system of the present disclosure, the learner may optionally review learning material for questions that they answered correctly.

Figure 6:
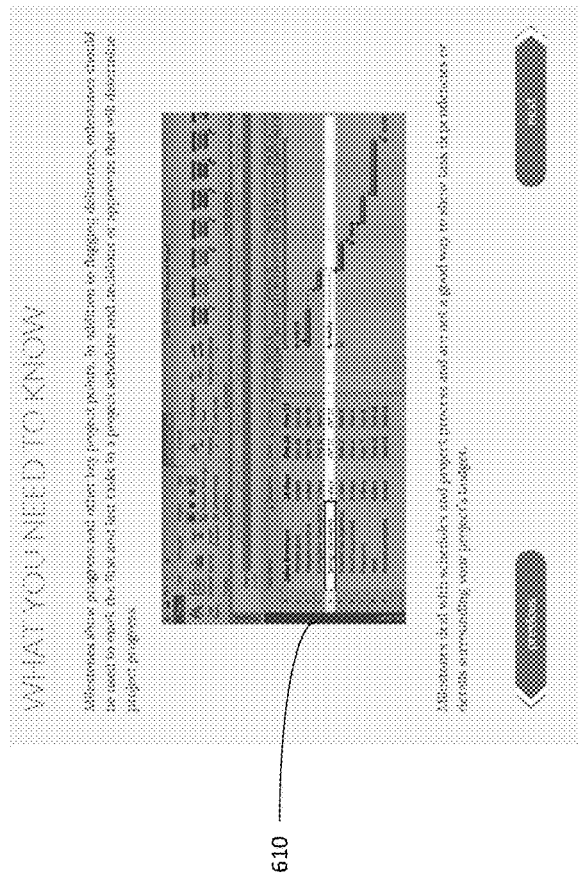
FIG. 6 shows an exemplary learning materials display interface of the present disclosure comprising image and video materials.
Figure 6:
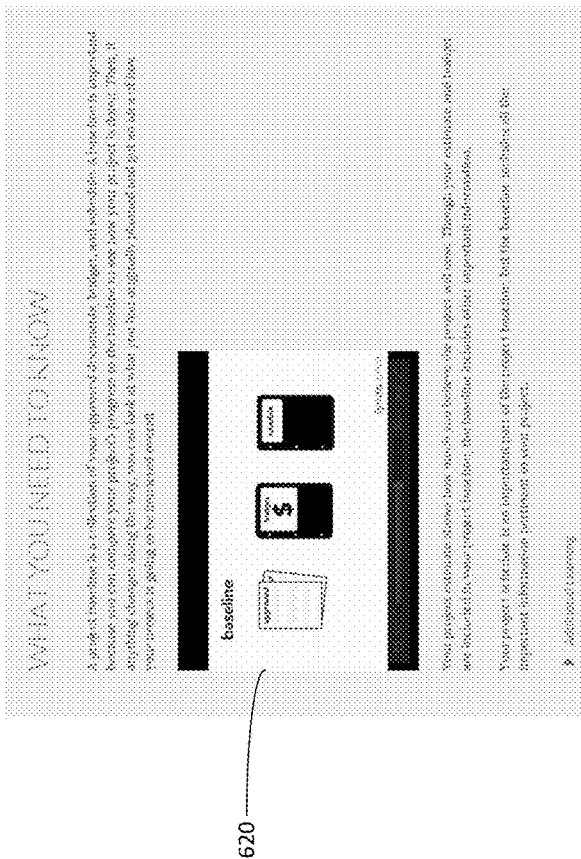

FIG. 6 shows additional types of learning material that may be displayed to a learner as a part of the module. Some learning material may include images as shown in the upper learning display 610, and some learning material may include videos as shown in the lower learning display 620. As discussed briefly earlier in this disclosure, questions and answers themselves about particular subject matter may vary in wording and presentation order when shown to a learner more than once. In a similar manner, learning material about particular subject matter may include vary in visual presentation to a learner if it is shown to a learner more than once. For example, a first time a learner sees a particular learning segment, it may comprise only written information, but if the learner encounters it again, it may also comprise a photo or a video. It is contemplated that other types of audio or visual learning materials may be included, such as charts, graphs, sound recordings, or the like. As will be discussed later in this disclosure, many data points may be gathered by the computerized system of the present disclosure over many tests and many learners. Different types of learning material may be presented in order to evaluate, over large data sets, which type of learning material is most effective for most learners. In some embodiments, this information may be used to refine the learning materials to maximize learner efficiency across large organizations.

FIG. 7 shows a feature that can also be used to refine questions themselves within modules. Because the testing, training, display, and reporting systems of the present disclosure can be used across various industries for various topics, many different individuals will be responsible for creating the questions, answers, and learning materials contained in the modules. The feedback input form 700 of FIG. 7 allows a learner to provide feedback about a particular question to facilitate the improvement of questions.

Figure 8:
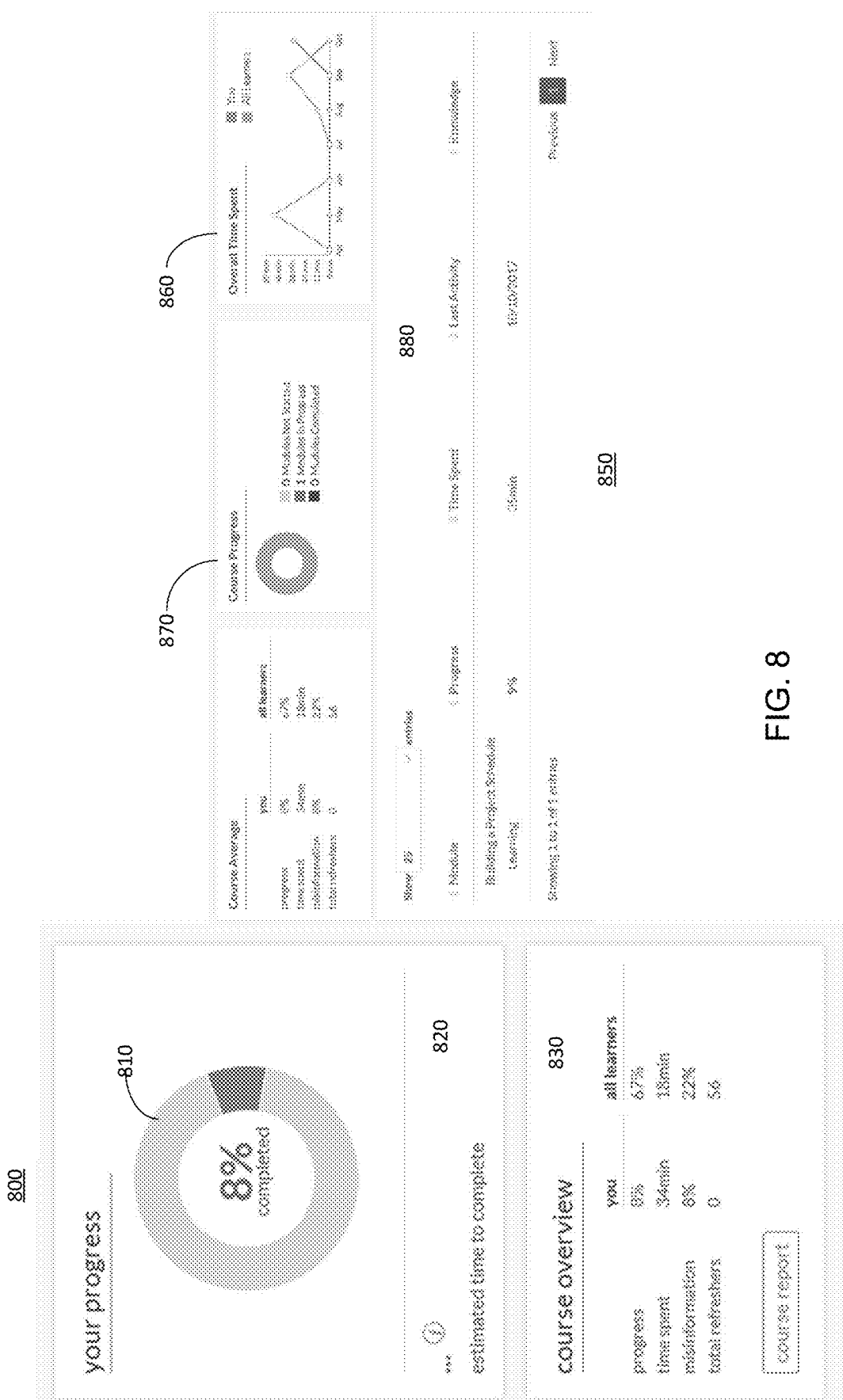
FIG. 8 shows an individual learner course dashboard comprising several visual information displays.

Another aspect of the disclosure comprises report and display systems for conveying meaningful information to test takers, supervisors, and administrators in easy-to-understand formats. FIG. 8 shows an exemplary progress displays for test takers. As shown, a progress summary display 800 shows a test-taker, through a circular graph 810, how much of a course a learner has completed. It also shows an estimated time to complete segment 820. This estimated time may be based on the time it has taken the learner so far and identifying patterns that the learner has shown so far and may be likely to demonstrate in the future. Alternatively, it may be based on how many questions are left and an average time of completion of a sample number of other learners. Directly beneath that segment 820 is a course overview comparison 830 between the test taker and other test takers. The progress summary display 800 provides several advantages for learners, such as allowing them to stop taking a module after making partial progress and quickly understanding where they are upon returning. Another advantage is giving them an estimate of time to complete, which may provide motivation to continue and perhaps improve. As discussed previously, several visual cues and features incentivize learners to accurately assess their performance to reduce time completing module. The course overview display 830 shows learner how he or she is doing compared to his or her peers, which may provide motivation either positively or negatively.

An individual learner's course dashboard 850 may show comparisons between the learner and all other learners using a line graph format 860. It may also include a separate course progress circular graph 870, which may help a learner visualize how many modules in the course are not started, started and in progress, and completed. A module table 880 below provides information on each of the modules. Though only one module is shown in the table 880, it is contemplated that in some courses, learners may have to take dozens of modules, so keeping track of progress of how many modules are complete, and detailed information about the progress within each one, may be convenient to a learner completing a large course over a long period of time.

Figure 9:
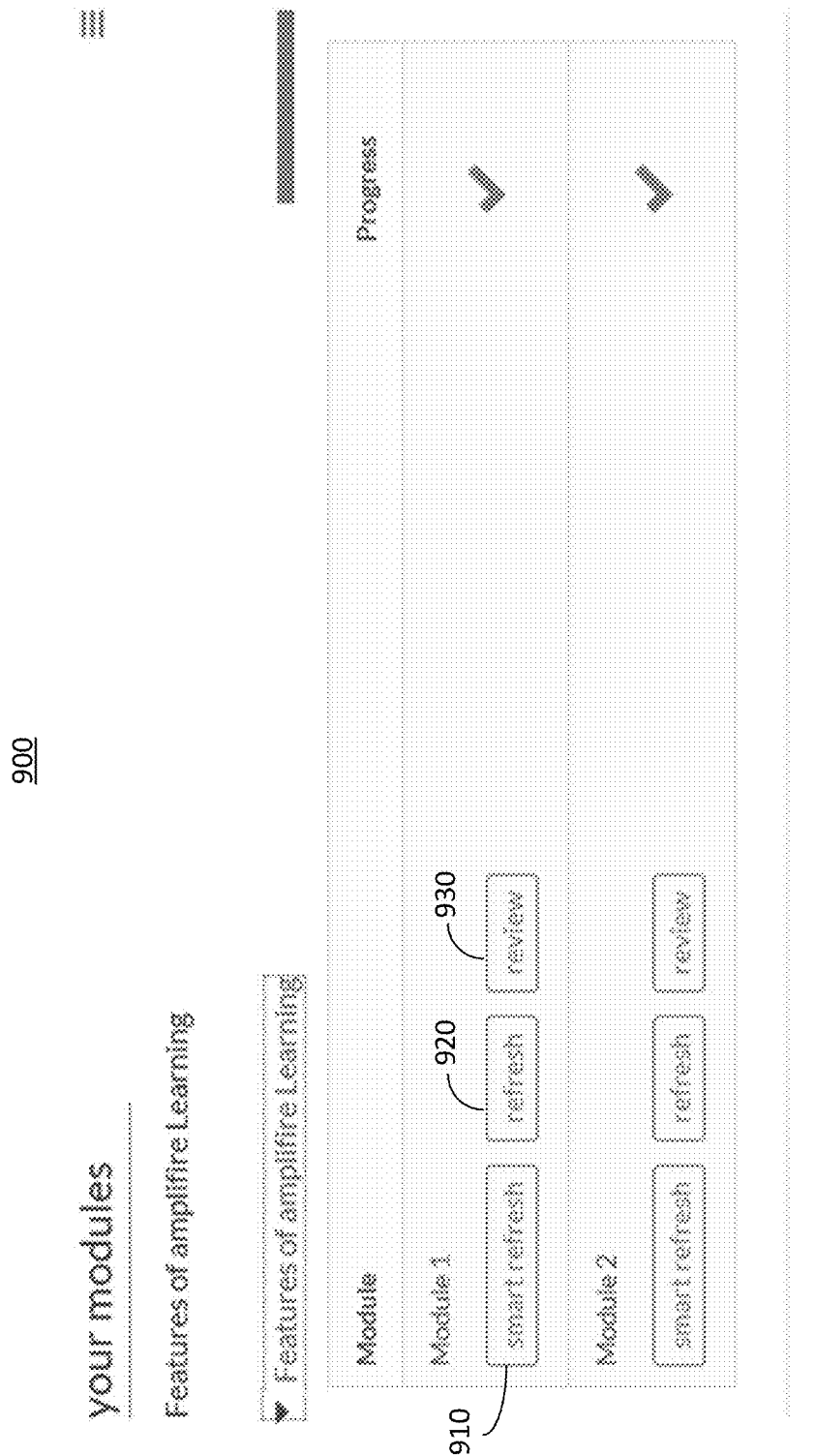
FIG. 9 shows an individual refresh and review interface of the present disclosure.

FIG. 9 shows another aspect of the learning system, which is a refresh and review interface 900. Here, a learner can access, for each module, a "smart refresh," "refresh," and a "review" option. Each of these modes is designed for a learner who has completed at least part of the module once and who needs to re-learn or reinforce the information in part or in whole. A learner may do this to study for an upcoming test or because these re-learning courses are assigned to them for job training purposes. A "smart refresh" mode 910 (which may also be referred to herein as a "smart refresher") is a mode in which a learner can retake just the portions of the module that he or she did not answer confidently and correctly immediately during the learner's first module try. That is, the smart refresh mode does not spend time on anything that the learner already knew prior to the first module try. The "refresh" mode 920 (also referred to herein as a "full refresh") is a full retaking of the module. The "review" mode 930 allows a learner to review the full list of questions, learning material, and correct answer. This review mode may only be available to a learner who has completed the entire module once, which provides an incentive for the learner to complete it.

Another aspect of the learning and display system comprises administrator displays for multiple learners. The displays of the present disclosure are designed to help supervisors or anyone else in charge of groups of learners identify two important metrics: misinformation and struggle. Misinformation, also known as confidently held misinformation, is the knowledge state wherein a learner is wrong but is sure that he or she is right. Confidently held misinformation has been identified as the most costly and dangerous knowledge state, especially in professional fields where life and health are at stake. Consider, for example, professionals in the medical field, or aviation. These individuals go through extensive training and must make many important decisions throughout each day. People's lives depend on them knowing correct information, and those professionals know that.

It is impossible for humans to know the correct information they need to know 100% of the time, but if an individual knows they don't know, or is unsure, of a correct answer, that individual is highly likely to look up the answer or seek help from someone else. However, if the aviation or medical professional is wrong but is sure that they are right, they are unlikely to ask anyone for help, and will likely proceed with a wrong decision. In such cases, confidently held misinformation can result in injury or loss of life. Even in fields where mistakes do not result in physical harm, confidently held misinformation can be costly in terms of money and productivity.

Previous learning systems lacked efficient ways to identify confidently held misinformation, if it was even identifiable at all. The display systems of the present disclosure allow supervisors and test administrators to identify such misinformation quickly and accurately at the level of individuals or across segments of an organization. Throughout the disclosure, the terms "supervisor," "administrator," or "manager" may be used somewhat interchangeably to refer to someone who has access to view the results for groups of particular learners. Knowledge about misinformation is invaluable; if a supervisor can identify a particular individual who has high levels of confidently held misinformation, or business units where an unusually high number of individuals had misinformation about the same topic, targeted remediation can be implemented immediately. As previously described, the question display and answer feedback system of the present disclosure helps learners assess their own confidence levels accurately, which captures when a learner has confidently held misinformation. Then, the display and reporting system identifies who, within an organization, has that misinformation, and what topic the misinformation concerns.

As mentioned, the reporting and display systems also show how much struggle was involved for a particular learner or a particular topic. The metric of struggle is defined by instances wherein a learner gets answers incorrect more than once. There are several variations of answer patterns that can fall within the definition of "struggle" in this system. For example, a learner might answer confidently and incorrect twice; or unsure and incorrect twice; or incorrect, correct, then incorrect (along with any possible knowledge state). In contrast, a learner's ease of progress can be defined as "learned it" in instances wherein the learner gets an answer incorrect once, but subsequently gets answers on the same topic correct without any problems. Alternatively, a learner's ease of progress may be defined as "knew it" for instances wherein the learner got all answers to a topic correct (even if one of those answers was with an unsure knowledge state). Measuring ease of progress in this way provides administrators an additional dimension to evaluate and address. When supervisors can easily identify that a particular learner struggled significantly more than others, or that many learners struggled on a particular subject, the supervisor can focus attention on those learners and those topics. Organizational problems can be solved more effectively when such insight is available through easy-to read data visualizations, rather than text or numerical tables. Beneficially, outliers can be detected at a glance, which are often the most relevant kinds of information a test administrator or supervisor needs.

Figure 10:
FIG. 10 shows a report home administrator dashboard comprising several visual information displays pertaining to multiple learners within a course.

FIG. 10 shows a "report home" administrator dashboard 1000 that provides overviews of courses taken by multiple leaners. An administrator may oversee several different courses, and may choose which reports to see in a course selection menu 1005. A course overview section 1010 shows numerical data including average progress of all learners through the course, average completion time, a percentage of misinformation, a number of refreshers taken, a number of total learners, and a number of total modules. A learner progress section 1020 has a circular graph 1025 showing a number of learners not started, a number of learners in progress, and a number of learners completed on the course. A course misinformation section 1030 shows, in horizontal bar graph formats, the percentage of misinformation (e.g., in red), uncertainty (e.g., in yellow), and mastery (e.g., in green) separately for each module. Some courses have many modules, and outliers of misinformation would be easily visible in this section. A course struggle section 1040 shows, in a vertical bar graph format, the ease of progress of the learners in total. In the example in FIG. 10, 4% of learners struggled, 51% learned it, and 45% knew it. The course misinformation section 1030 and course struggle section 1040 show high-level visual summaries of these metrics. It is contemplated that the sections shown on this report home dashboard 1000 may be customized to show the most relevant summary information that an administrator wants to view. Views on subsequent displays will show these metrics in greater detail.

Figure 11:
FIG. 11 shows a course summary administrator dashboard comprising additional data visualization displays.

FIG. 11 shows more detailed data visualizations of a particular course in a course summary administrator dashboard 1100. A "course average" section 1110 shows text and numerical averages and totals of various measures of the course and what learners have done in the course. A learner progress section 1020 shows a learner progress section 1120, which may be repeated from the report home dashboard 1000 of FIG. 10. The learner progress section may be useful to have at a glance on this display because the relevance of the other visual information may be a function of how many learners are in progress or have yet to take the module. For example, if only one or two learners has begun or completed the course, the sample size may not be big enough for the administrator to derive any conclusions about the course. However, if, as shown in FIG. 11, if more than half of the total learners have begun or completed the course, the information about the course and the module becomes sufficient to identify patterns and outliers.

Figure 15:
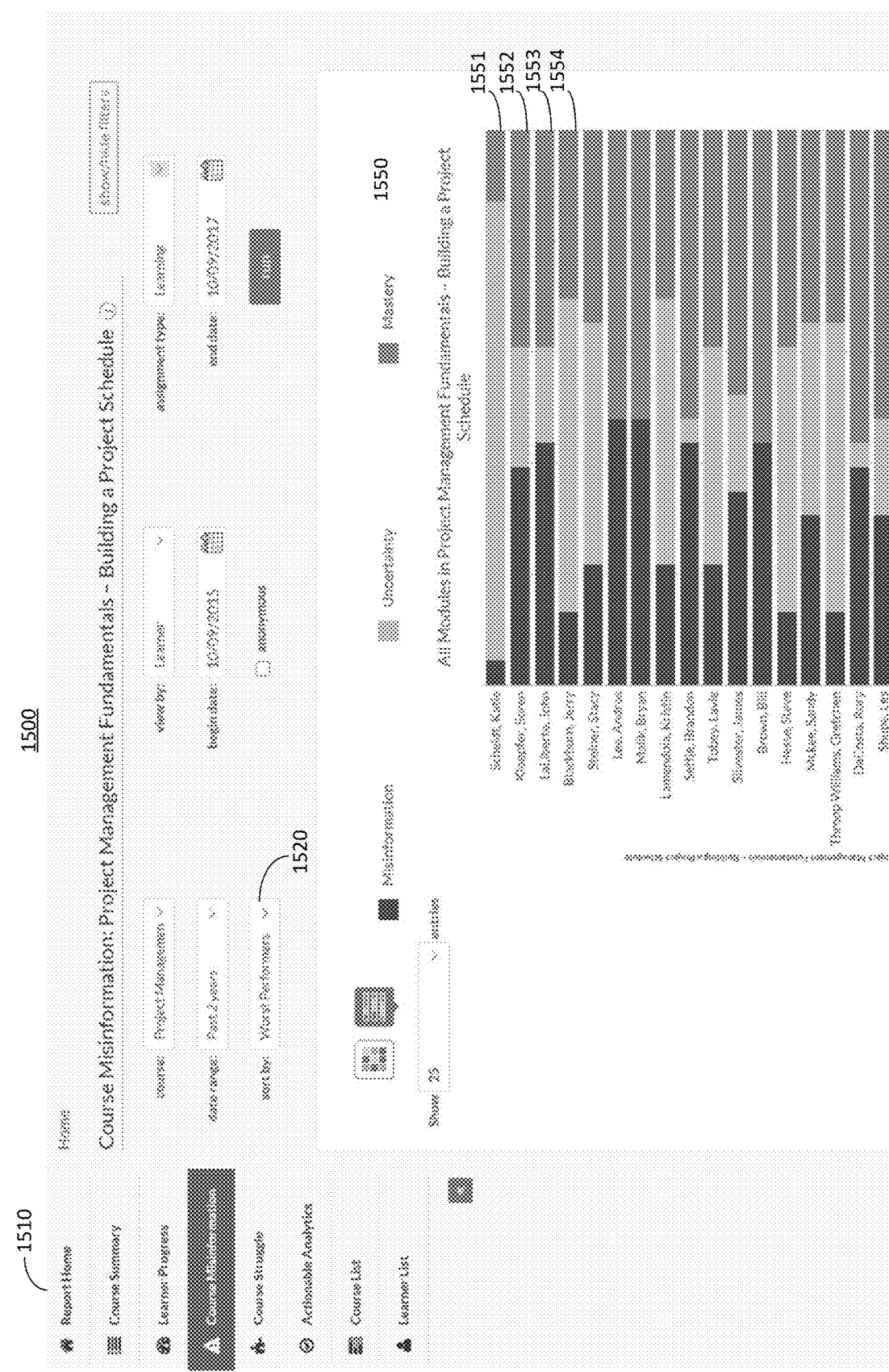
FIG. 15 shows a course misinformation administrator dashboard displaying bar graph visualizations of quantified information from multiple learners in a course.

A "most challenging module" section 1130 shows bar graph comparisons of each module in the course with a calculation of "average NPA" in the modules. This simply shows which module had the most instances of information, and may be presented as a list or other visual in other embodiments. A "module progress" section 1140 shows average progress, completion time, last activity, and average knowledge of learners during the different variations of each module. The variations include a learning mode, full refresher, and smart refresher, as explained earlier in the disclosure. As shown, an "average knowledge" metric 1145 may be shown by a horizontal bar graph. The bar graph shown represents a roll-up (i.e., average) of the misinformation, uncertainty, and misinformation of all the learners who have completed the module. The individual reports on the learners whose scores are represented by this average are shown in FIG. 15. It is an expected result is that learners who took the smart refresh variation had higher average knowledge (such as 100% mastery) because they had previously completed the course successfully.

From the course summary dashboard 1100, an administrator can choose to view additional information about individual modules. An administrator can select a variation of Module 1, such as the learning module 1150 to view additional details about the learning module, as shown in FIG. 12.

Figure 12:
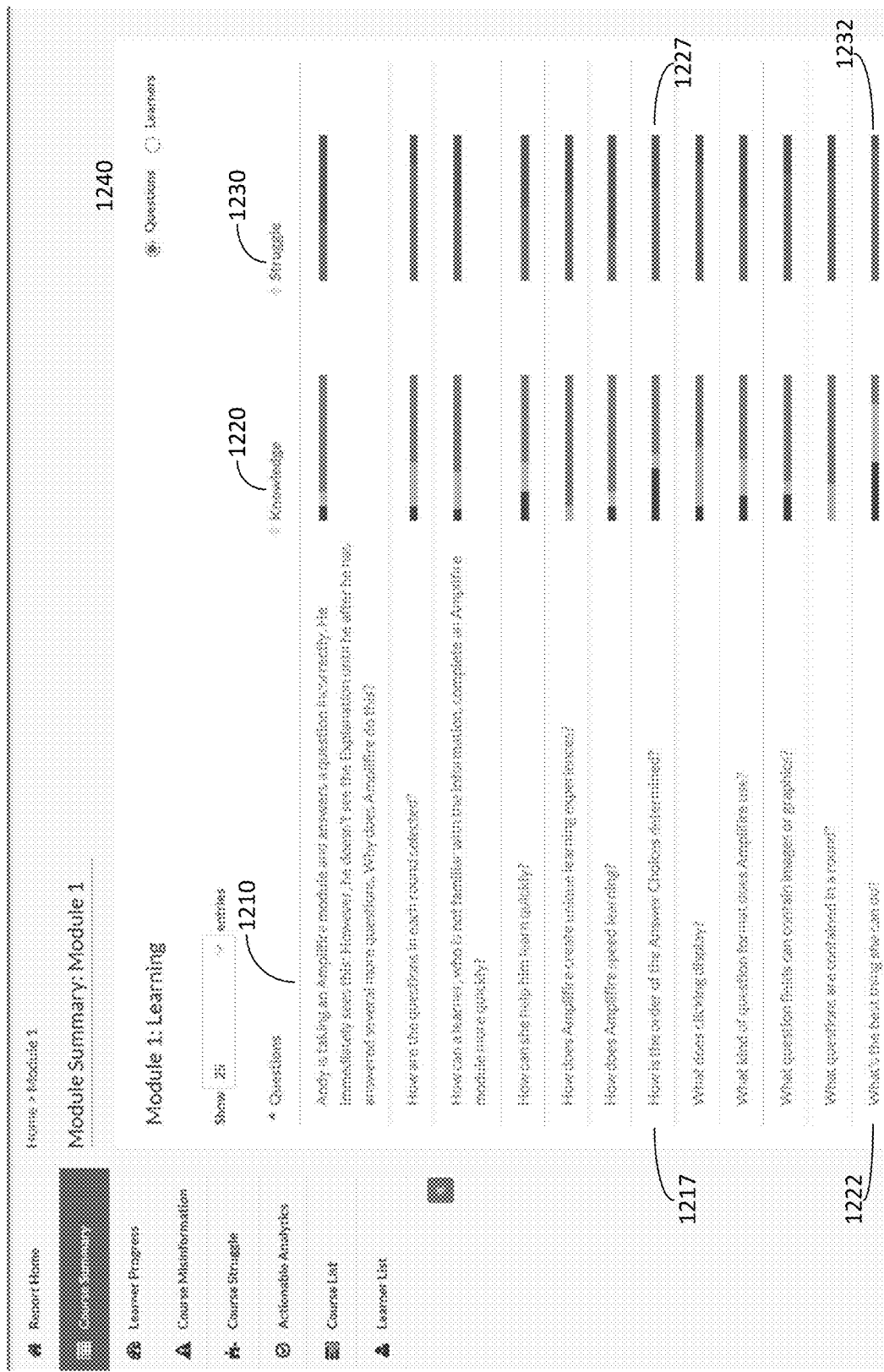
FIG. 12 shows a module summary administrator display which is an available subcategory of the course summary administrator dashboard of FIG. 11.

FIG. 12 shows a view that is available when an administrator clicks on the learning module link 1150 shown in FIG. 11. This view shows a misinformation (knowledge) column 1220 and a struggle column 1230 for each question in the module, which are listed in a question column 1210. This view allows a detailed look at particular questions within a module that may be difficult for many learners in terms of either misinformation or struggle. For example, the seventh question on the list 1217 shows an unusually high amount of misinformation across many learners, as does the twelfth question on the list 1222. This view also shows that even though this is a question that identifies high levels of misinformation, the same learners do not struggle much to learn the correct answer, as shown in the corresponding struggle graphs 1227 and 1232. Such information may be important to an administrator. With this knowledge, the administrator can know that future learners may be likely to have similar misinformation, but that it is easy to correct. This may impact an organization's strategy for teaching such things early and often to new hires, for example.

An administrator can also change the view of information in this module such that misinformation and struggle is viewable on a learner-by-learner basis instead of a question-by-question basis. Such information gives additional insight into whether particular learners have high levels of information and This view can be selected on the screen by clicking on the "learners" portion of the sorting feature 1240. Turning back briefly to FIG. 11, each of the variations of modules may be selected in to view the information shown in FIG. 12 by question and by learner. The administrator may select the full refresher and smart refresher module variations and see relative levels of knowledge and struggle in each. In most situations, the misinformation and struggle for those variations should be lower than for the learning modules, but the views allow the administrator to identify whether that is not the case. Each of the display features allow quick identification of important granular details that could be easily missed if they only existed in text form.

Figure 13:
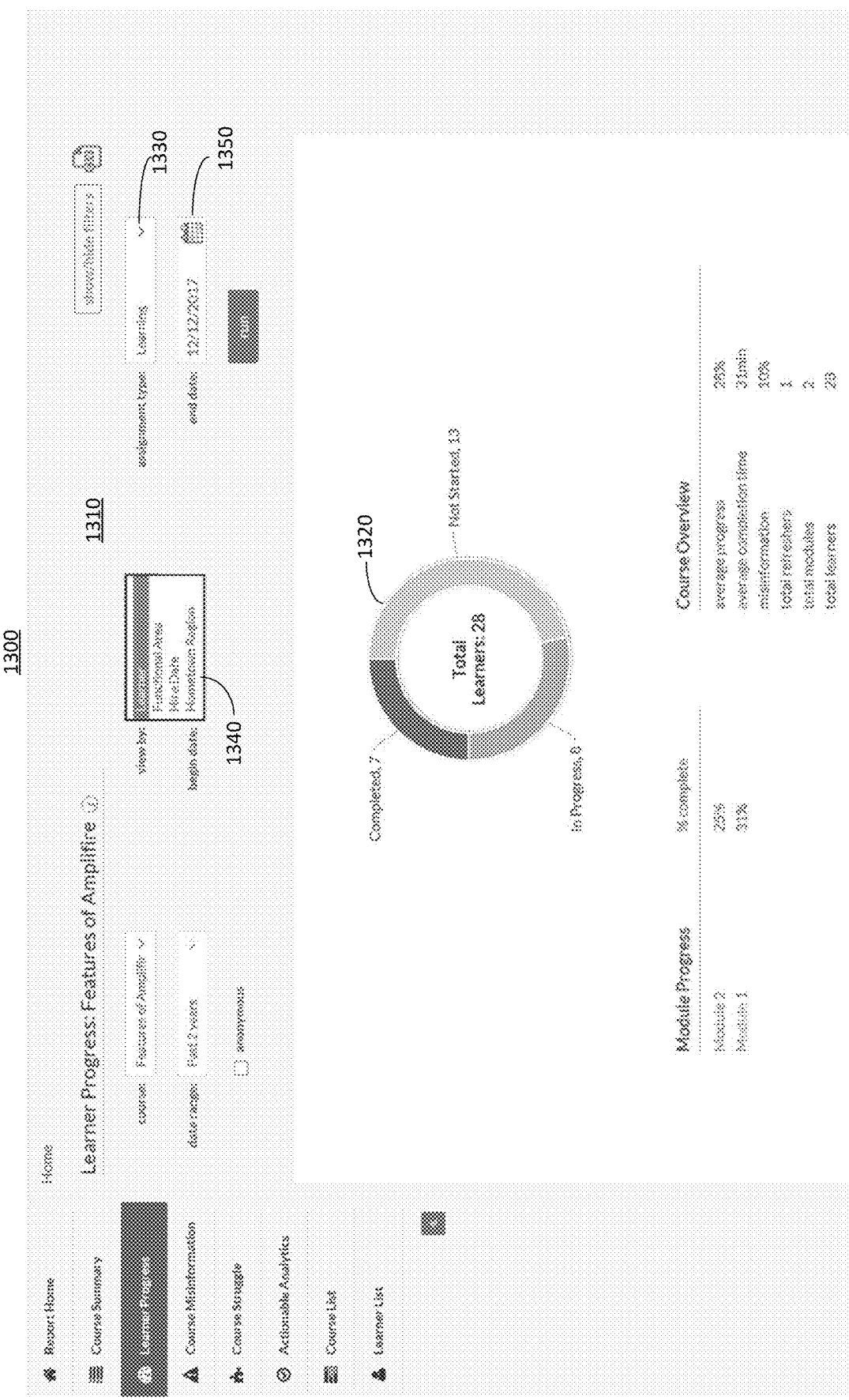
FIG. 13 shows a learner progress administrator dashboard with sortable menus for report generation.

FIG. 13 shows a learner progress dashboard 1300 that provides a view of the progress of sets of learners through courses. This dashboard 1300 view is sortable by a "view-by" drop-down menu 1310, which in this embodiment shows that the circular graph 1320 can be sorted according to total learners to whom the course is available, functional area, hire date, and hometown region. It is contemplated that other sorting criteria may be implemented as well. The dashboard 1300 view can also be sorted by other criteria through the "assignment type" drop-down menu 1330 and the "begin date" and "end date" calendar menus 1340 and 1350. The assignment type drop-down menu 1330 may allow an administrator to choose from the learning mode, full refresh mode, and smart refresh mode to further refine the display criteria. As shown, when an administrator selects a view of particular types of learners from the view-by drop-down menu 1310, the administrator can see on the circular graph 1320 how many learners have completed, started, and not started the course.

These views are beneficial for the various ways many organizations conduct their learning and testing operations. In many workplaces, for example, it is impractical to schedule all employees, or even groups of employees, for testing at the same time like in school. Employees may need period of several weeks or months to complete learning and testing modules, depending on various factors such as their complexity and the amount of continuous learning required in a particular field. When testing is conducted over a period of time, this learner progress dashboard view can help an administrator identify several things that may be occurring within a group of learners. For example, the administrator may be able to see whether a significant number of learners procrastinate, whether learners take a long time to complete the courses once they start, and, whether enough learners have taken a course to derive meaningful conclusions about the content. By sorting the learners by other criteria, such as hire date, an administrator can view whether all new hires—an especially important group to monitor, have timely completed a course. By viewing learners by functional group or geographic area, an administrator can identify patterns and recognize whether a particular functional group or geographic area is exceptionally fast or slow at completing modules, which provides opportunities for administrators to offer targeted praise or corrective efforts. Identifying such patterns without the visual display shown in the learner progress dashboard 1300 would be difficult and cumbersome, even with the sorting features available on spreadsheets, because of the multiple dimensions of information conveyed in these views (i.e., type of learner, type of learning mode, date, and three categories of course progress). The display on the learner progress dashboard 1300 overcomes such difficulties.

FIG. 14 shows a list view 1400, which is on a lower portion of the learner progress dashboard 1300 shown in FIG. 13. The list view 1400 shown in FIG. 14 is organized alphabetically by learner, which corresponds to the "learner" selection in the view-by menu 1310. Each of the columns in this list view 1400 can be used to further sort according to the column criteria. The list view 1400 also changes to correspond to the other possible selections in the view-by menu 1310, such that the first column 1410 may alternatively show a list of functional area, hire date, or geographical area, for example.

FIG. 15 shows another aspect of the display system of the present disclosure, which is the course misinformation dashboard 1500. A main menu side bar 1510 is shown on the left of the screen, as it has been in other figures. Many computer users are familiar with menu options displayed in this manner, which can be used to guide a user to important topics of interest available to the user. A unique feature of the display system is that the concepts of "course misinformation" and "course struggle" are such important topics of interest that can be displayed to a user in a main menu. In these sections, the dashboards can take complex information gathered from learners the learning interface input displays and distill it into useful, intuitive, and actionable visual feedback.

The course misinformation dashboard 1500 provides several ways for an administrator to view the important metric of misinformation according to several criteria. Similar to the learner progress dashboard 1300, the course misinformation dashboard allows the administrator to sort the view by learner, functional area, hire date, and geographical region, as well as by assignment type, date range, and course. The information displayed here is a misinformation graph 1550. In this view, knowledge states of learners are grouped into three categories, which are misinformation, indicated in one color (red, for example), uncertainty, indicated in another color (yellow, for example), and mastery, indicated in another color (green for example.) As discussed previously, several possible patterns of answers may result in the designations of misinformation, uncertainty, and mastery, respectively. For example, the misinformation designation may be assigned to a learner about a particular question (or module or topic) if a learner answered two similar questions "sure and incorrect", or answered "not sure" and incorrect on one question and then "sure and incorrect subsequently." In other words, multiple different answer combinations may result in the designation of "misinformation." One advantage to distilling many possible answer combinations into just three designations is that having three categories allows the administrator to focus on the most critical information. Other, more detailed category breakdowns with additional color representations are available in other views. However, it is important for administrators to be able to recognize misinformation at a glance.

The misinformation bar graph 1550 can be further sorted according to best and worst performers from a graph sorting drop-down menu 1520. The misinformation bar graph 1550 shows a view sorted by worst performers. As shown, the worst performer bar graph 1551 is shown as the one with the greatest total uncertainty and misinformation together, but is not necessarily the one with the most misinformation alone. In various embodiments, the calculation of "worst performer" may be either the one shown (with the highest combination of uncertainty and misinformation) or the one with the most misinformation. Different algorithms may be used to weight and calculate different rankings of performance. As shown, in this particular graph, the second worst performer bar graph 1552 shows a learner with the high amount of uncertainty and misinformation, but who performed worse than the learner shown by the third worst performer bar graph 1553, even though that learner had more misinformation. This may be because in the algorithm used to calculate the results shown weights very high amounts of uncertainty higher, resulting in a "worse" performance. However, in other embodiments, these learners may be sorted by "most misinformation"

Another feature that is available in this misinformation bar graph view is that an administrator may hover over sections of the bar graph and view a numerical percentage represented by the section. For example, a pop-up bubble may be displayed when a cursor is over a yellow "uncertainty" section to display the percentage of uncertainty and the name of the learner whose answers are represented by the graph. This pop-up numerical percentage display may be available in other displays, including the bar graph and the heat map display discussed below.

Figure 16:
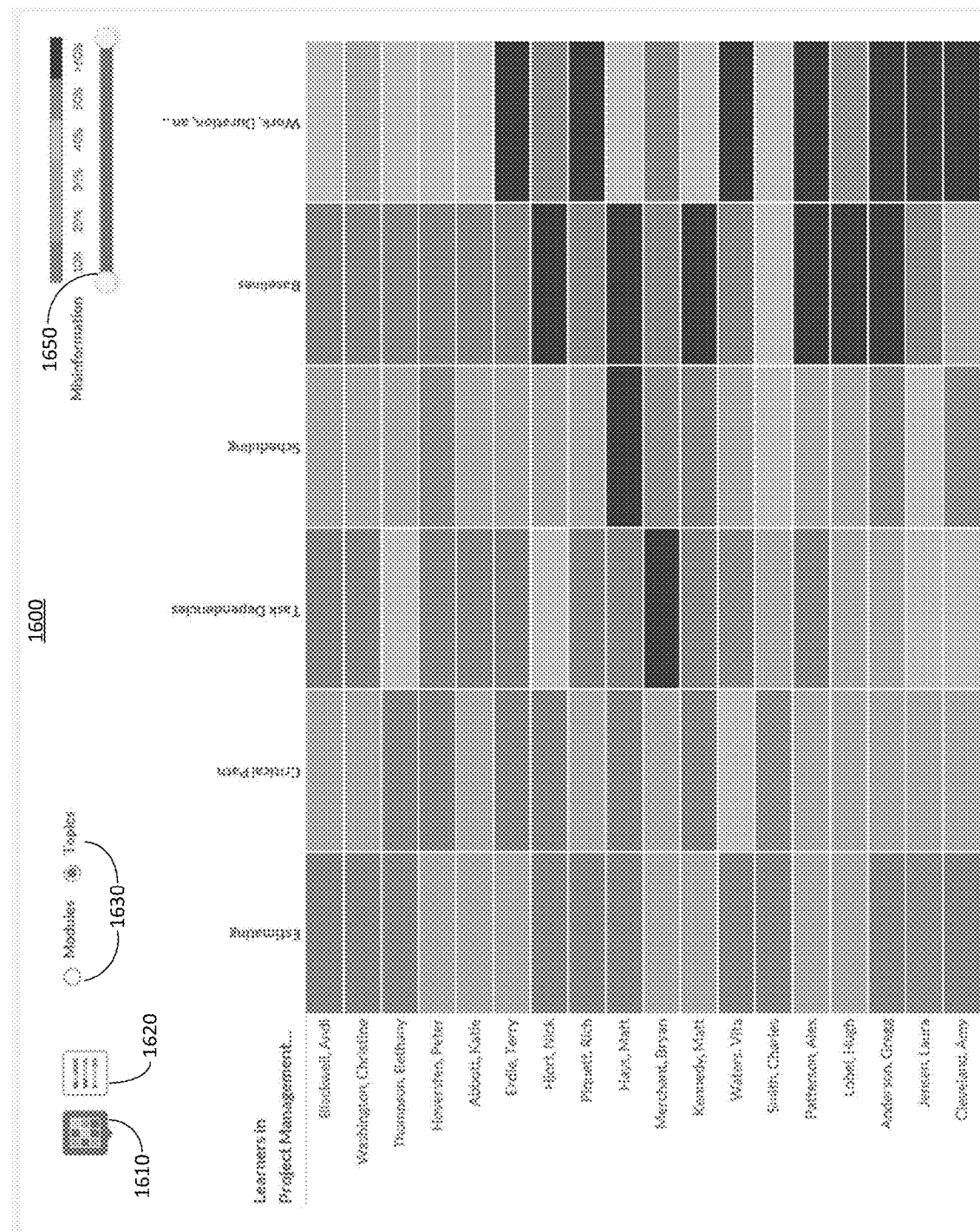
FIG. 16 shows a detailed heat map data visualization display showing misinformation by learners in a course, sorted by learner and topic.

The course misinformation dashboard 1500 can also display misinformation data in a more detailed, but still intuitive format. Turning now to FIG. 16, shown is a "heat map" display 1600 that illustrates levels of misinformation by topic. An administrator can use the heat map display option icons 1610 and the bar graph display option icon 1620 to switch between the views shown in FIGS. 16 and 15. Additionally, an administrator can use selector option 1630 to switch between showing entire modules or showing topics in this heat map display 1600. The heat map display 1600 shows levels of misinformation by topic, with a color-coded misinformation level key 1650. Each topic represents a roll-up of several questions within the topic. This key 1650 shows a range of colors from green to red, as an example, each associated with certain percentages of misinformation. As shown, percentages of misinformation are represented by different colors at 10%, 20%, 30%, 40%, 50%, and greater than 50%. In the misinformation bar graph 1550 shown in FIG. 15, there were only 3 categories spanning a larger range of percentages, but the heat map display 1600 shows more detailed percentage break-downs. In the heat map view 1600, which is sorted by "best performers" and topics, several pieces of information are available to an administrator at a glance. For example, an administrator can see that even the worst performers only had high levels of information on one or two topics. An administrator can also see that most of the misinformation among all learners was concentrated over two topics, which may indicate that particular subject matter or particular questions about that subject matter were especially difficult for most learners.

Figure 17:
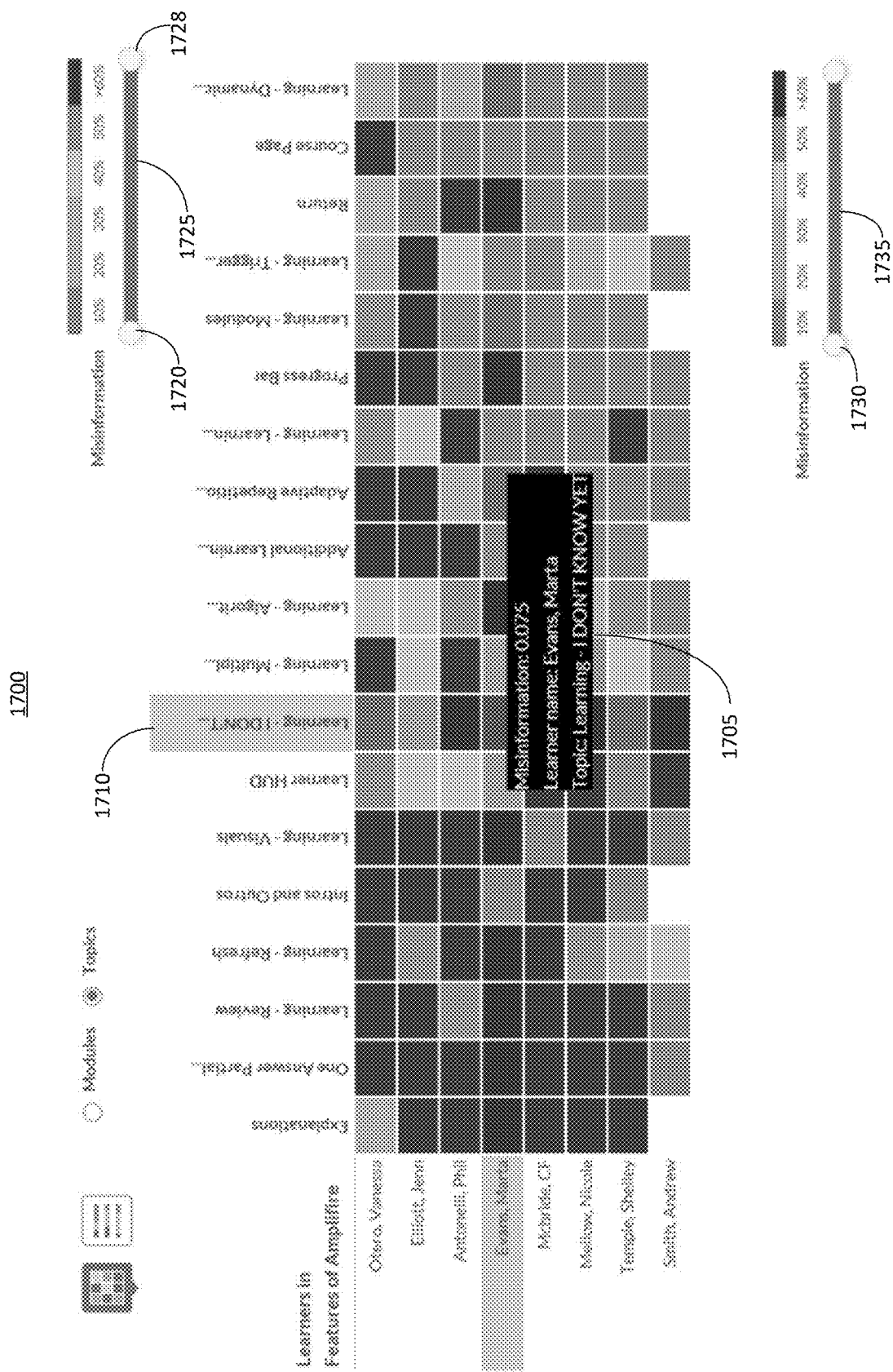
FIG. 17 shows additional features of the heat map data visualization display of FIG. 16.

FIG. 17 shows additional features available in the heat map view. The heat map display 1700 is sorted by worst performers and topic. In this view, there are more topics shown than in the heat map display 1600 of FIG. 16, and many data points are visually represented. An administrator can tell at a glance which topics were the subject of the most information, and which learners performed the worst, but additional visual cues assist the administrator in identifying more detailed information. When an administrator hovers over a particular block in the heat map, a pop-up numerical percentage 1705 may appear, which displays the percentage of misinformation. As described earlier, red can represent any percentage over 60%, so it may be useful to see the actual percentage within that range. Additionally, the pop-up 1705 may show the learner's name and topic so that an administrator can easily view this information in the midst of many data points represented by the color-coded blocks. Another feature is that the learner's name and topic may be highlighted with a row highlighter 1720 and column highlighter 1710 to further assist the administrator's view. This heat map display 1700 allows administrators to look down particular rows in order to identify poor performers and down particular columns to identify difficult topics. Administrators may wish to de-clutter this display by removing some visual indicators. An administrator can do so by clicking and dragging an indicator 1720 along a show/hide adjustment bar 1725 (a duplicate version 1730 and 1735 is shown at the bottom of the screen). clicking and dragging the indicator across the bar results in certain percentage ranges to be shown or hidden on the heat map display 1700. For example, if an administrator drags the indicator 1720 to a spot on the adjustment bar 1725 that corresponds with the 40% mark, only the blocks representing misinformation above 40% will be shown on the heat map display 1700, and the rest of the blocks will be hidden. The administrator may drag a second indicator 1728 from the opposite side of the adjustment bar in order to limit the percentage range from the upper bounds. The adjustment bar feature allows administrators to see specific ranges of performance, which may assist them in making changes in future versions of a test. For example, if an administrator is looking to streamline future tests, he or she may select a range of only misinformation of 10-20% to quickly identify topics that learners rarely have misinformation, and eliminate those.

Figure 18:
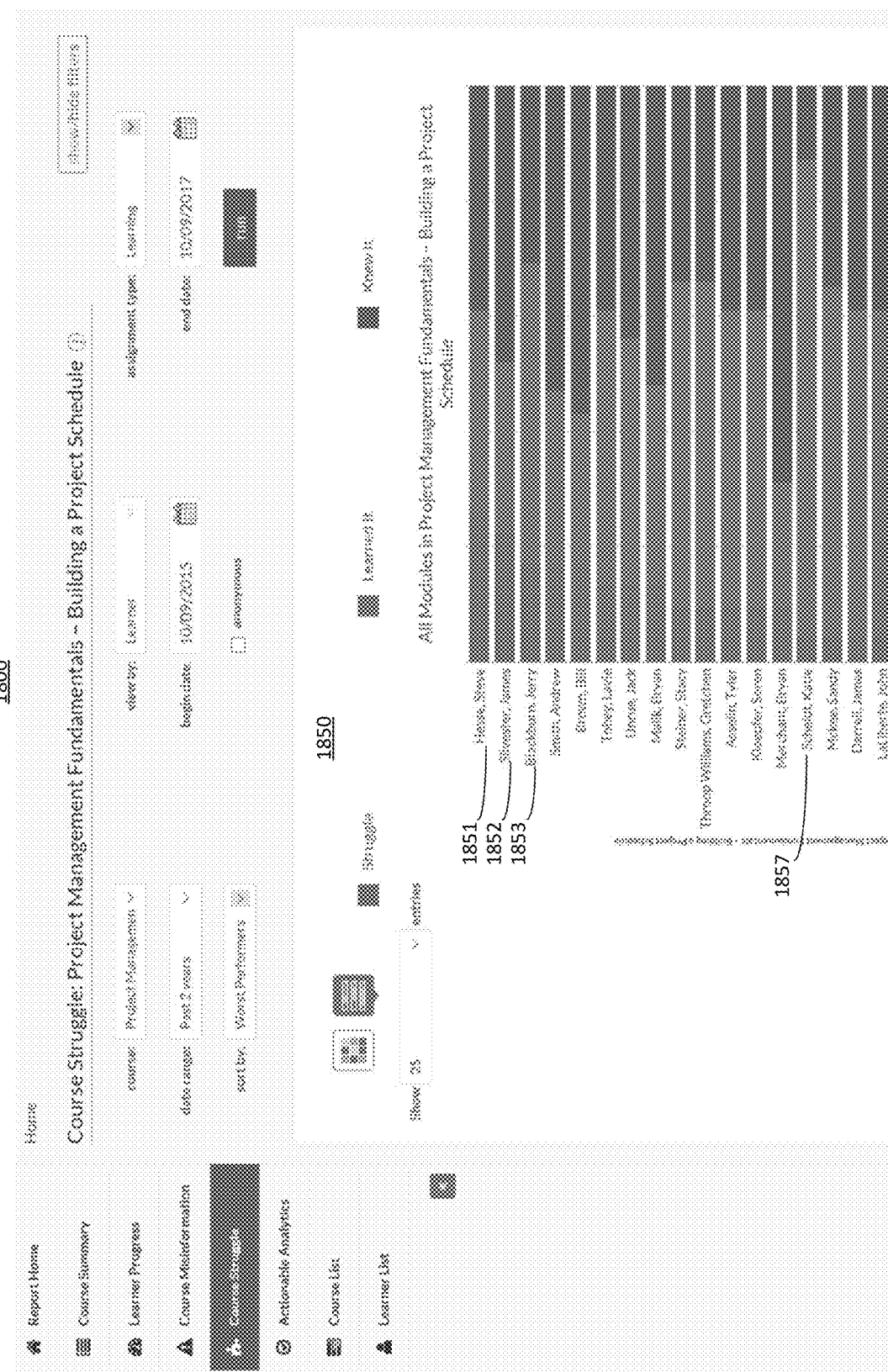
FIG. 18 shows a course struggle administrator dashboard displaying bar graph visualizations of quantifies information from multiple learners in a course.

FIG. 18 shows a course struggle administrator dashboard 1800. This dashboard 1800 is similar to the course misinformation dashboard 1500, but allows an administrator to view struggle, which is the other main metric of the display system. "Struggle" is a measure of non-progress attempts, which may encompass anything other than a confident and correct after seeing the correct learning material at least once. As shown, the course struggle dashboard 1800 has a struggle bar graph 1850 that places measurements in one of three categories, the categories being "struggle," "learned it," and "knew it," each corresponding to certain algorithmically determined sequences of answers and knowledge states collected. The struggle bar graph 1850 is also sortable by similar categories as the misinformation bar graph 1550, and the one shown is sorted by worst performers. For this metric, the worst performers are the ones with the most struggle, as shown by the bar graphs for the first three learners 1851, 1852, and 1853. The learner 1857 who is fourth from the bottom had a much larger percentage of topics categorized as "learned it" than any of the three worst performers 1851, 1852, and 1853, which reflects that in this metric, struggle itself is the most important thing to identify. This ranking indicates that not having previous knowledge, but learning it without struggle, is fine, but struggling to learn is a metric that requires extra attention.

Figure 19:
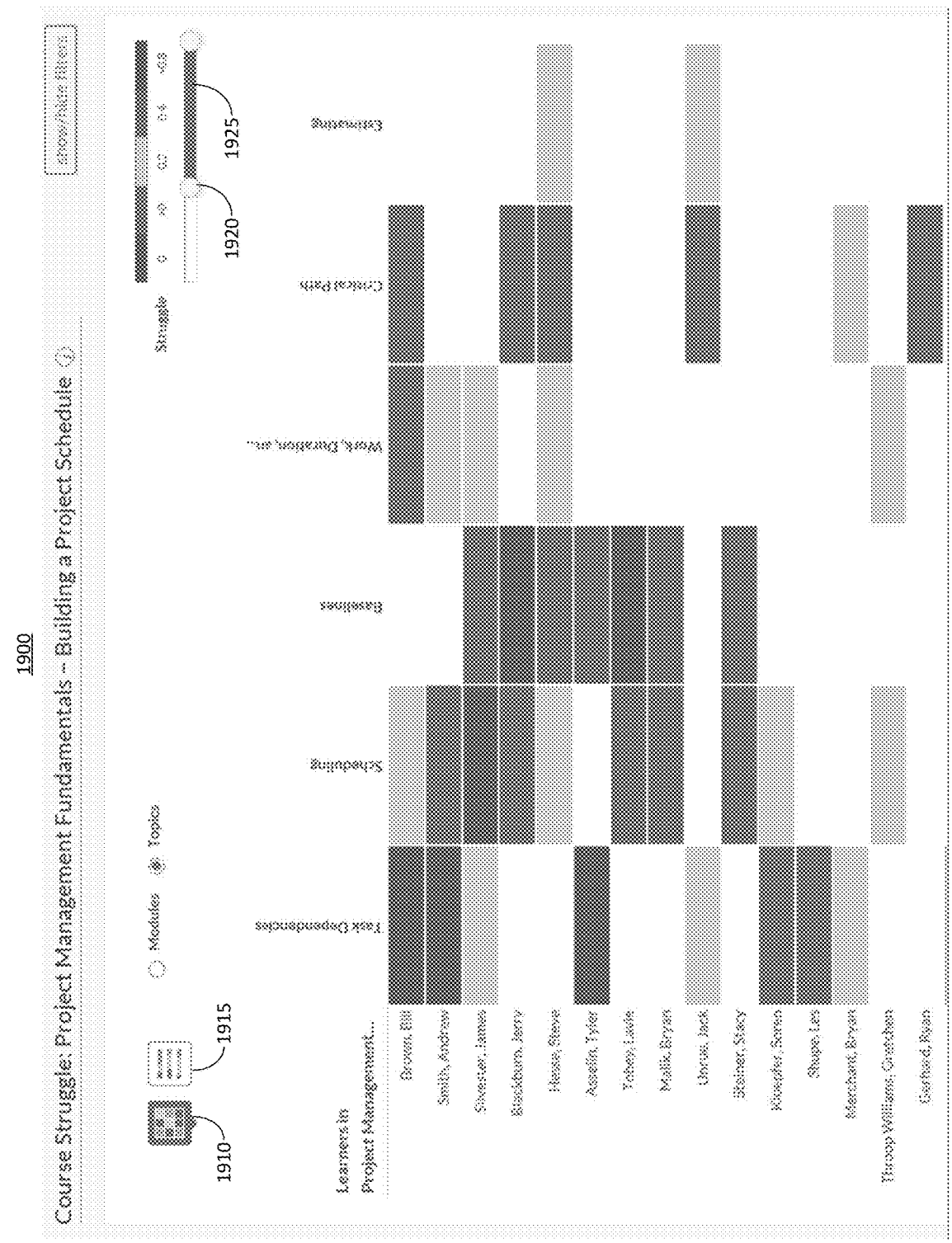
FIG. 19 shows a detailed heat map data visualization display showing struggle by learners in a course, sorted by learner and topic.

FIG. 19 shows a heat map display 1900 that provides a more detailed breakdown of metrics of course struggle shown in the course struggle dashboard 1800. This heat map display 1900 is similar to the heat map display 1700 of FIG. 17, which showed course misinformation. In many embodiments, the colors (or patterns) of each range of struggle may be different from the colors or patterns used in the course misinformation heat map display 1700, so an administrator can easily differentiate between the two. An administrator can use the heat map display option icons 1910 and the bar graph display option icon 1915 to switch between the views shown in FIGS. 19 and 18. The heat map display 1900 also comprises an indicator 1920 and a show/hide adjustment bar 1925 to allow an administrator to view only certain levels of struggle of interest. As shown, the indicator 1920 is placed to correspond with a level of struggle only above 0.2. The numerical measurement of struggle is less than one (i.e., 0, 0.2, 0.4, etc.) because the measure is a count of non-progress attempts. Typically, a learner will make only one or two non-progress attempts, and these attempts may be spread out over several questions on the same topic. A learner is likely to not struggle on every single question in the topic. This placement of the indicator makes visual blocks depicting "no struggle" or "very little struggle" disappear, leaving only visual indicators of the topics with the most struggle.

Figure 20:
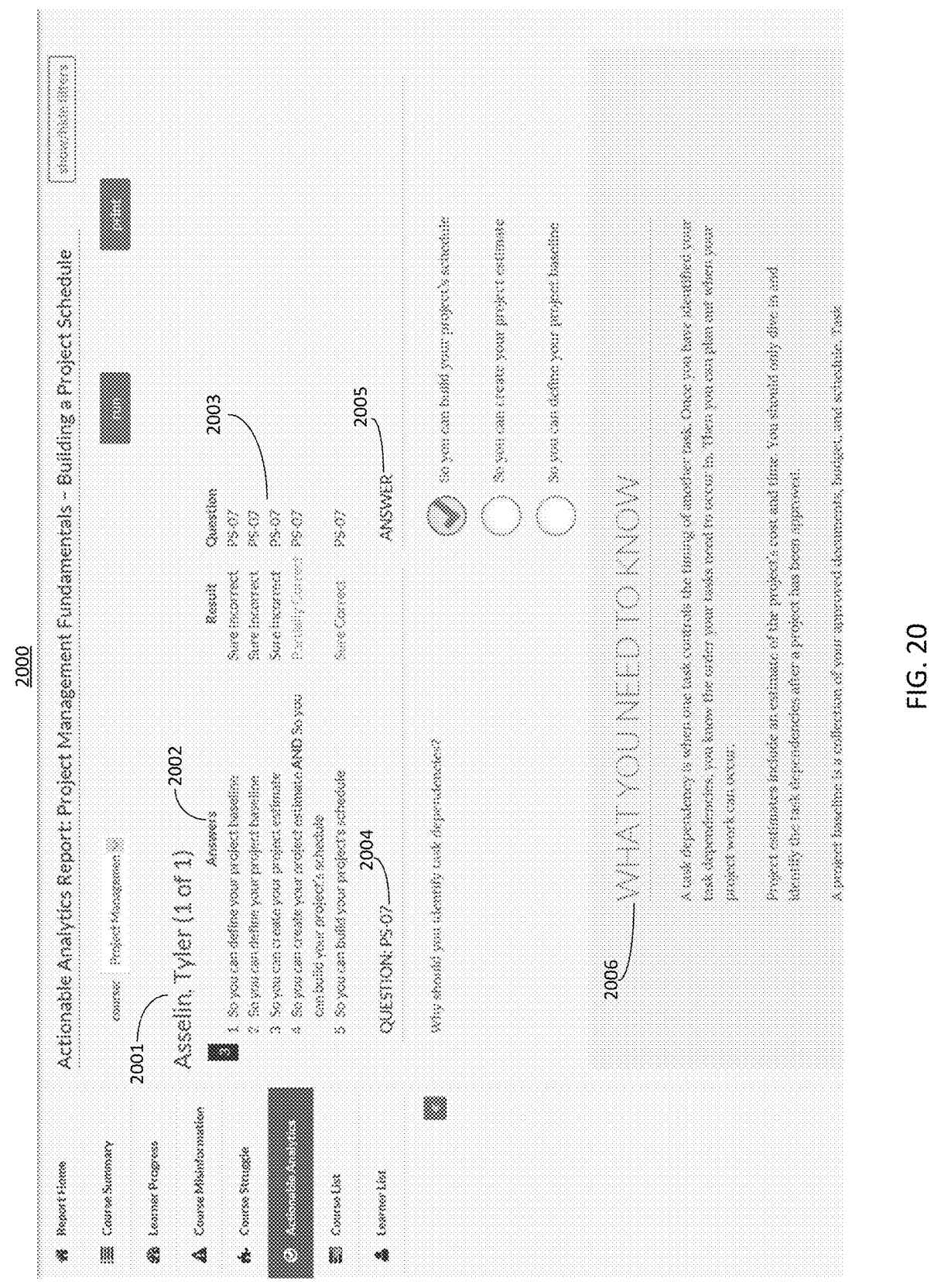

Another aspect of the system of the present disclosure is that individual learner reports that show specific answer patterns may be compiled and presented in easy-to-use formats. FIG. 20 shows a screen corresponding to the menu option "Actionable Analytics." These actionable analytics reports show the actual answer and knowledge state patterns given by a user which resulted in the categorizations of "misinformation," "struggle," or both. As shown, the actionable analytics report view 2000 shows a list of learners with a first learner 2001 at the top. The first learner 2001 has a parenthetical description 2002 which shows what question, and out of how many, is being referred to for this particular learner. For this first learner 2001, this is question "1 out of 1" for which there is a performance concern such as misinformation and struggle. The previous dashboard views in FIGS. 15-19 show color-coded and numerical representations of these performance issues. As previously discussed, though, the categorizations of misinformation and struggle can result from a variety of answer and knowledge state combinations. Providing an entire sequence of answer combinations in a spreadsheet or other report could easily be too voluminous and cumbersome to be useful. However, the sequence of answer combinations just for the most troublesome questions may be extremely useful to a manager or learning administrator.

FIG. 20 shows an answer sequence 2003 for the first learner 2001, who answered the same question sure and incorrect three times in a row before answering partially correct (i.e., he picked two unsure answers) and then finally answering sure and correct. This particular answer sequence indicates both misinformation (at least one sure and correct answer) and struggle (more than one incorrect answer). Some learners on this list may have answer sequences that were troublesome for just misinformation, or just struggle.

Some embodiments may allow the administrator to sort for either just misinformation or just struggle. Below the answer sequence 2003, the question 2004, answer 2005, and learning material 2006 are reprinted. The actionable analytic report view 2000 in FIG. 20 shows just a top section of a report comprising details on multiple learners. Though the first learner has only one problematic answer sequence, other learners may have several, and for each, the answer sequence, question, answer, and learning material are reproduced. This report allows an administrator to view, print, and send just the most relevant insights about a learner's problematic assessment experience. A manager or instructor can then use this report to review with the learner, and efficiently address misinformation or struggle. A benefit of this report view is that it extracts and presents, out of a large database, exactly the information a manager and learner would need.

Figure 21:
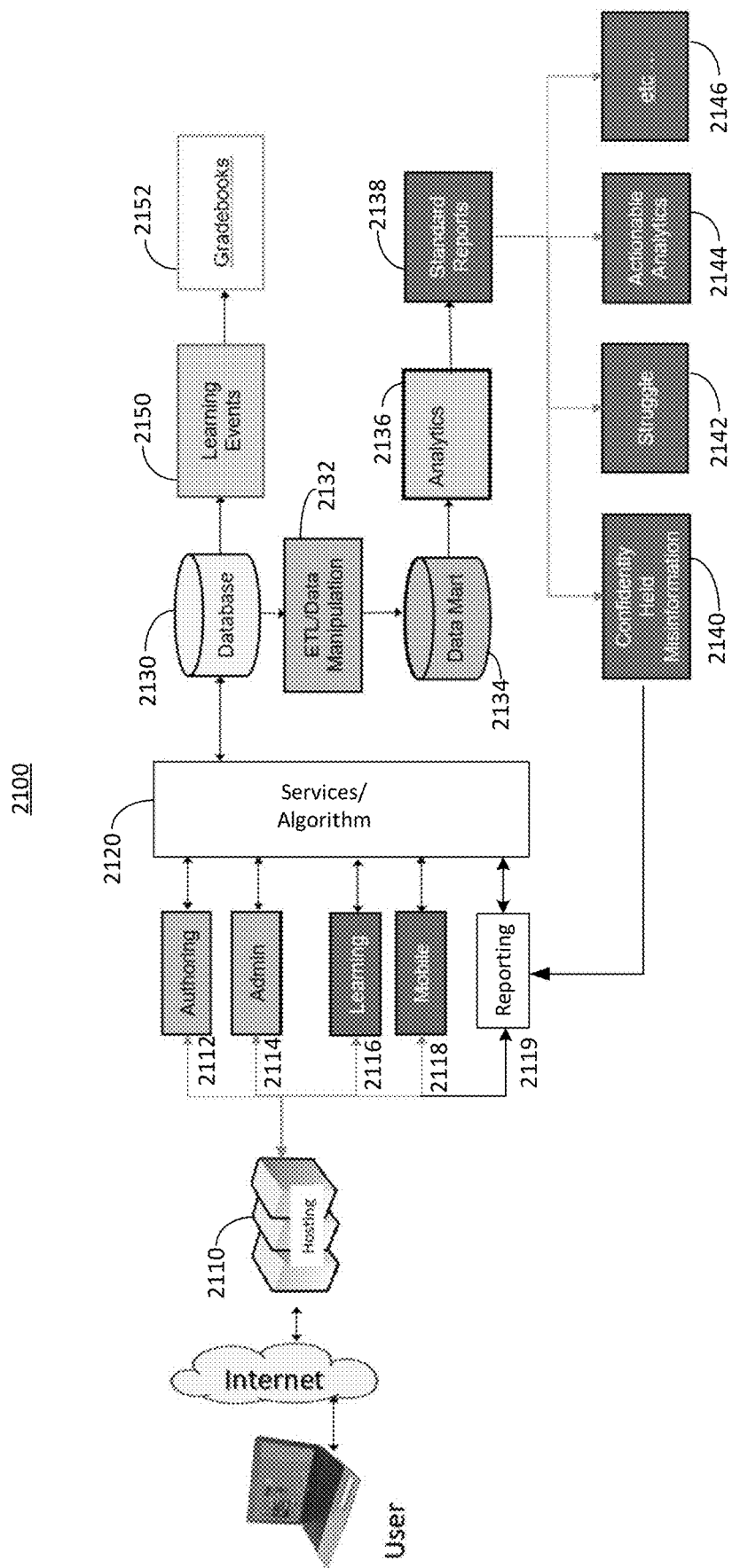
FIG. 21 shows a logical diagram of the display and report generation system configured to implement aspects of the present disclosure.

The display and report generation system described herein may be implemented via a distributed network and database system 2100 as shown in FIG. 21. In many embodiments, the display and report generation system may be implemented as software-as-a-service, the programs of which may be hosted at hosting servers 2110. The system 2100 provides several user interface dashboards, including an authoring interface 2112, an administrator interface 2114, a learning interface 2116, and a mobile interface 2118. The features and functions of the administrator interface 2114 and the learning interface 2116 have been described in detail throughout the disclosure. The authoring interface 2112 is configured to allow an author to write the questions, answers and learning materials shown and described throughout the figures. It is also configured to allow the author to view question feedback shown in FIG. 7, and to edit questions and answers based on such feedback and recognized patterns of learner misinformation or struggle. That is, if an author recognizes, through the course struggle dashboard, course misinformation dashboard, or actionable analytics reports that performance may be adversely impacted by a poorly written question, answer, or learning material, the author can edit it through the authoring interface 2112. The mobile interface 2118 may allow any type of user, including an author, administrator, or learner to view and interact with any of the authoring, administration, or learning dashboards in a mobile computing device format. The reporting interface 2119 displays the various dashboards shown and described throughout the disclosure, including the course misinformation dashboard and course struggle dashboard.

The displays and functions provided through the interfaces are provided with service-oriented software implementing various algorithms described throughout this disclosure, as depicted in the services/algorithms component 2200. These services and algorithms derive their outputs for display on the interfaces through inputs from the transactional database 2130. The transactional database 2130 collects inputs from the learning interface 2116 and stores raw data collected therefrom, such as learner answers, learner identification, time taken to complete questions or modules, orders of answers, etc. The data in the transactional database 2130 is used by the services/algorithm component 2120 to provide functions back to the users. For example, the answers given by a learner are used to determine when to show learning material, when to repeat a question, and what order to present the subsequent questions.

However, the data as stored in the transactional database 2130 is not in a particularly usable format for reporting purposes. Therefore, the system utilizes ETL (extract, transfer, load)/Data Manipulation component 2132 which takes the data stored in the transactional database and transforms it into usable data sets for reporting. This ETL/Data Manipulation component 2132 performs functions such as rolling up particular data sets, creating averages, extracting identified metrics of interest, etc. This manipulated data in then stored in the Data Mart component 2134, which may also be referred to as a reporting database. The Data Mart component 2134 stores reporting data in a usable format for the reporting features of the present disclosure. The analytics component 2136 applies algorithms for determining what information will be displayed in various reports. Data is applied through the analytics component, to produce standard reports 2138. These comprise the reports shown in the dashboards described throughout the disclosure, including confidently held misinformation reports 2140, struggle reports 2142, actionable analytics reports 2144, and other customizable reports 2146. As shown, each of these reports are displayed through the reporting interface 2119. Aspects of the reports are also made available to the other interfaces through certain services applications in the services/algorithm component 2120. For example, parts of the reporting interface may be displayed through or incorporated into the administrator interface 2114.

Another function of the system is that the database 2130 further can export particular "learning events" 2150 to interfaces with external learning management systems. Learning events may include certain milestones or metrics that are helpful for a manager or administrator to be alerted to when they occur. These can include events such as when a learner completes a module, or when a learner retakes a module, or when all assigned learners have completed a module. Notifications of these events may be actively pushed out through learning management systems. There are a number of learning management systems in the industry, and the "gradebooks" component 2152 represents an interface (e.g., an application program interface) that allows the learning event information 2150 to be transferred to those systems.

Figure 22:
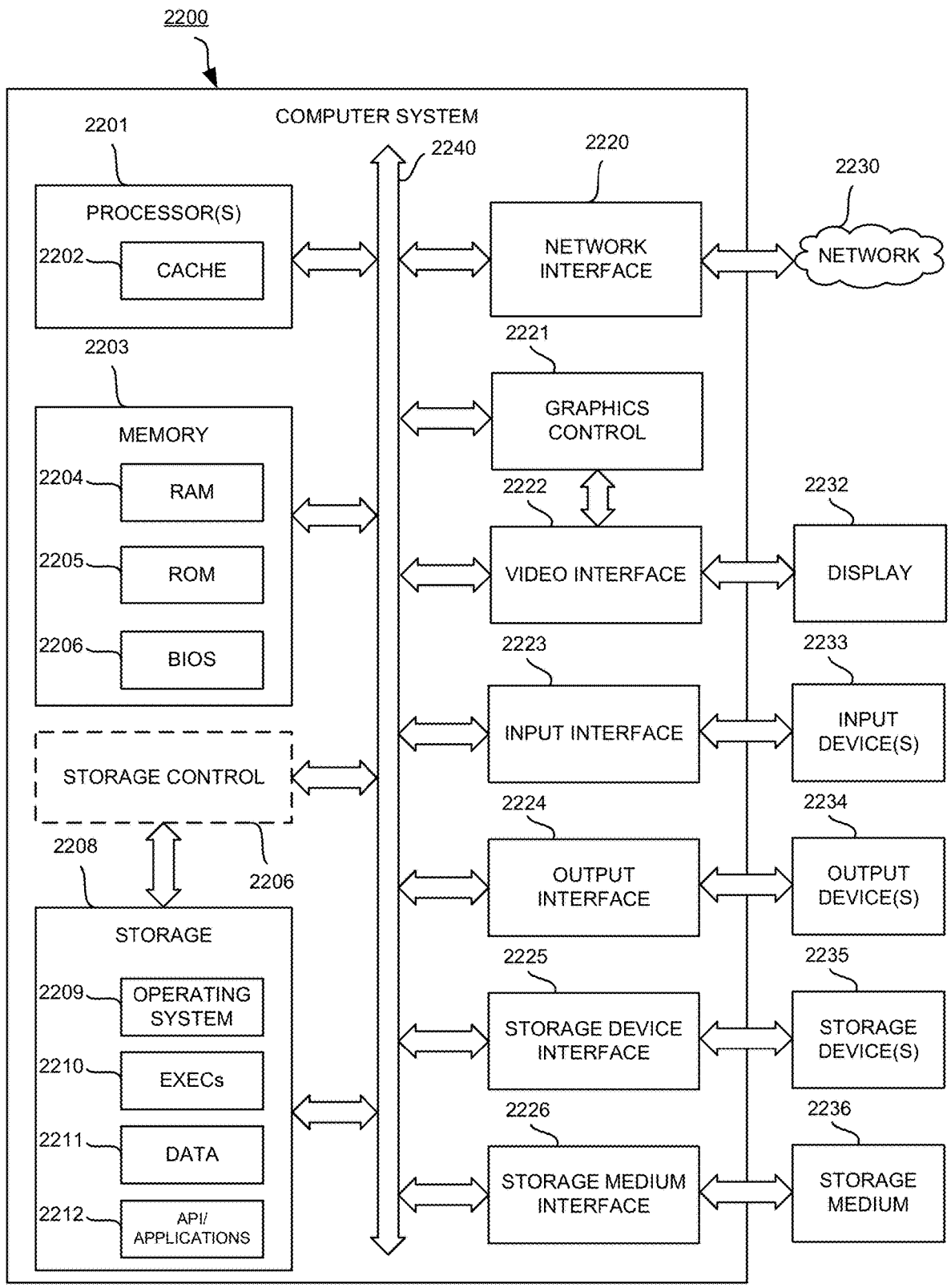
FIG. 22 shows a logical diagram of computing devices that may be used to implement aspects of the present disclosure.

The systems and methods described herein can be implemented in a machine such as a processor-based system in addition to the specific physical devices described herein. FIG. 22 shows a diagrammatic representation of one embodiment of a machine in the exemplary form of a processor-based system 2200 within which a set of instructions can execute for causing a device to perform or execute any one or more of the aspects and/or methodologies of the present disclosure. The components in FIG. 22 are examples only and do not limit the scope of use or functionality of any hardware, software, embedded logic component, or a combination of two or more such components implementing particular embodiments.

Processor-based system 2200 may include processors 2201, a memory 2203, and storage 2208 that communicate with each other, and with other components, via a bus 2240. The bus 2240 may also link a display 2232 (e.g., touch screen display), one or more input devices 2233 (which may, for example, include a keypad, a keyboard, a mouse, a stylus, etc.), one or more output devices 2234, one or more storage devices 2235, and various tangible storage media 2236. All of these elements may interface directly or via one or more interfaces or adaptors to the bus 2240. For instance, the various non-transitory tangible storage media 336 can interface with the bus 2240 via storage medium interface 2226. Processor-based system 2200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 2201 (or central processing unit(s) (CPU(s))) optionally contain a cache memory unit 2202 for temporary local storage of instructions, data, or computer addresses. Processor(s) 2201 are configured to assist in execution of processor-executable instructions. Processor-based system 2200 may provide functionality as a result of the processor(s) 2201 executing software embodied in one or more tangible, non-transitory processor-readable storage media, such as memory 2203, storage 2208, storage devices 2235, and/or storage medium 2236. The processor-readable media may store software that implements particular embodiments, and processor(s) 2201 may execute the software. Memory 2203 may read the software from one or more other processor-readable media (such as mass storage device(s) 2236, 2236) or from one or more other sources through a suitable interface, such as network interface 2220. The software may cause processor(s) 2201 to carry out one or more processes or one or more steps of one or more processes described or illustrated herein. Carrying out such processes or steps may include defining data structures stored in memory 2203 and modifying the data structures as directed by the software.

The memory 2203 may include various components (e.g., machine readable media) including, but not limited to, a random access memory component (e.g., RAM 2204) (e.g., a static RAM "SRAM", a dynamic RAM "DRAM, etc.), a read-only component (e.g., ROM 2205), and any combinations thereof. ROM 2205 may act to communicate data and instructions unidirectionally to processor(s) 301, and RAM 2204 may act to communicate data and instructions bidirectionally with processor(s) 2201. ROM 2205 and RAM 2204 may include any suitable tangible processor-readable media described below. In one example, a basic input/output system 2206 (BIOS), including basic routines that help to transfer information between elements within processor-based system 2200, such as during start-up, may be stored in the memory 2203.

Fixed storage 2208 is connected bidirectionally to processor(s) 2201, optionally through storage control unit 2207. Fixed storage 2208 provides additional data storage capacity and may also include any suitable tangible processor-readable media described herein. Storage 2208 may be used to store operating system 2209, EXECs 2210 (executables), data 2211, APV applications 2212 (application programs), and the like. Often, although not always, storage 2208 is a secondary storage medium (such as a hard disk) that is slower than primary storage (e.g., memory 2203). Storage 2208 can also include an optical disk drive, a solid-state memory device (e.g., flash-based systems), or a combination of any of the above. Information in storage 2208 may, in appropriate cases, be incorporated as virtual memory in memory 2203.

In one example, storage device(s) 2235 may be removably interfaced with processor-based system 2200 (e.g., via an external port connector (not shown)) via a storage device interface 2225. Particularly, storage device(s) 2235 and an associated machine-readable medium may provide nonvolatile and/or volatile storage of machine-readable instructions, data structures, program modules, and/or other data for the processor-based system 2200. In one example, software may reside, completely or partially, within a machine-readable medium on storage device(s) 2235. In another example, software may reside, completely or partially, within processor(s) 2201.

Bus 2240 connects a wide variety of subsystems. Herein, reference to a bus may encompass one or more digital signal lines serving a common function, where appropriate. Bus 2240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 2200 may also include an input device 2233. In one example, a user of processor-based system 2200 may enter commands and/or other information into processor-based system 2200 via input device(s) 2233. Examples of an input device(s) 2233 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 2233 may be interfaced to bus 2240 via any of a variety of input interfaces 2223 (e.g., input interface 2223) including, but not limited to, serial, parallel, game port, USB, FIREWIRE, THUNDERBOLT, or any combination of the above.

In particular embodiments, when processor-based system 2200 is connected to network 2230, processor-based system 2200 may communicate with other devices, specifically mobile devices and enterprise systems, connected to network 2230. Communications to and from processor-based system 2200 may be sent through network interface 2220. For example, network interface 2220 may receive incoming communications (such as requests or responses from other devices) in the form of one or more packets (such as Internet Protocol (IP) packets) from network 2230, and processor-based system 2200 may store the incoming communications in memory 2203 for processing. Processor-based system 2200 may similarly store outgoing communications (such as requests or responses to other devices) in the form of one or more packets in memory 2203 and communicated to network 2230 from network interface 2220. Processor(s) 2201 may access these communication packets stored in memory 2203 for processing.

Examples of the network interface 2220 include, but are not limited to, a network interface card, a modem, and any combination thereof. Examples of a network 2230 or network segment 2230 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 2230, may employ a wired and/or a wireless mode of communication. In general, any network topology may be used.

Information and data can be displayed through a display 2232. Examples of a display 2232 include, but are not limited to, a liquid crystal display (LCD), an organic liquid crystal display (OLED), a cathode ray tube (CRT), a plasma display, and any combinations thereof. The display 2232 can interface to the processor(s) 2201, memory 2203, and fixed storage 2208, as well as other devices, such as input device(s) 2233, via the bus 2240. The display 2232 is linked to the bus 2240 via a video interface 2222, and transport of data between the display 2232 and the bus 2240 can be controlled via the graphics control 2221.

In addition to a display 2232, processor-based system 2200 may include one or more other peripheral output devices 2234 including, but not limited to, an audio speaker, a printer, and any combinations thereof. Such peripheral output devices may be connected to the bus 2240 via an output interface 2224. Examples of an output interface 2224 include, but are not limited to, a serial port, a parallel connection, a USB port, a FIREWIRE port, a THUNDERBOLT port, and any combinations thereof.

In addition or as an alternative, processor-based system 2200 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A data collection, display, and report generation platform comprising:
    a first input interface configured to:
    present a learning module comprising a series of questions and answers on a plurality of successive question/answer screens of the first input interface, wherein at least one of the successive question/answer screens are presented based on answers on a previous question/answer screen, and at least one of the plurality of successive screens comprising a plurality of radio buttons, each of the plurality of radio buttons associated with an answer to a question, and at least one of the radio buttons configured to accept both:
    a first input action alone, and
    the first input action and a subsequent second input action, wherein the first input action causes the at least one of the radio buttons to provide a first visual indication of the first input action, and the subsequent second input action causes the at least one of the radio buttons to provide a second visual indication of the second input action,
    wherein the first input action and the second input action each indicate a different confidence level of a user's answer;
    a display dashboard configured to:
    display a plurality of data visualizations of metrics of misinformation and struggle of plurality of users on one or more interactive screens based on a plurality of answers collected through the first input interface, wherein the display dashboard comprises:
    one or more bar graph displays;
    one or more heat map displays; and
    one or more sorting tools configured to alter the one or more bar graph displays or one or more heat map displays.

2. The platform of claim 1, further comprising:
    a report generation interface configured to display a list comprising one or more learners and at least one answer sequence provided by the one or more learners, wherein the answer sequence:
    was collected from answers entered on the first input interface by the one or more learners, and
    indicates the metrics of misinformation or struggle by the one or more learners.

3. The platform of claim 1, wherein the display dashboard comprises:
a course misinformation dashboard; and
a course struggle dashboard.

4. The platform of claim 1, wherein the one or more heat map displays are sortable by learner and topic.

5. The platform of claim 1, where the one or more bar graph displays are sortable by learner and topic.

6. The platform of claim 1, wherein the one or more heat map displays are sortable by each of hire date, geographic region, functional region, and performance level.

7. The platform of claim 1, wherein the one or more bar graph displays are sortable by each of hire date, geographic region, functional region, and performance level.

8. The platform of claim 4, wherein the one or more heat map displays comprise a plurality of color-coded blocks each corresponding to percentages of misinformation or struggle for each learner on each topic.

9. The platform of claim 8, wherein the one or more heat map displays further comprise:
a selector tool that corresponds to ranges of percentages and the adjustment of which hides at least one of the color-coded blocks.

10. The platform of claim 4, wherein each of the color-coded blocks of the heat map display are configured to show a pop-up text and numerical display of information when a cursor is held over any of the color-coded blocks.

11. The platform of claim 10, wherein the text and numerical display comprise one or more of:
a name of a learner;
a description of a topic; and
a numerical percentage.

12. The platform of claim 4, wherein the heat map display is configured to highlight a name and a topic corresponding to each of the color coded blocks when a cursor is held over any of the color-coded blocks.

13. The platform of claim 1, wherein the first input interface is configured to display visual prompts of an artificial-intelligence guidance system, wherein the prompts comprise written instructions or encouragement to a user and appear in response to particular answer sequences.

14. The platform of claim 1, wherein the first input action causes a written description of the confidence to appear adjacent to the radio button.

15. A data collection, display, and report generation platform comprising:
a first input interface configured to:
present a series of questions and answers on a plurality of successive question/answer screens of the first input interface, wherein at least one of the successive question/answer screens are presented based on answers on a previous question/answer screen, and at least one of the plurality of successive screens comprising a plurality of radio buttons, each of the plurality of radio buttons associated with an answer to a question, and at least one of the radio buttons configured to accept both:
a first input action alone, and
the first input action and a subsequent second input action, wherein the first input action causes the at least one of the radio buttons to provide a first visual indication of the first input action, and the subsequent second input action causes the at least one of the radio buttons to provide a second visual indication of the second input action,
wherein the first input action and the second input action each indicate a different confidence level of a learner's answer;
a learner dashboard configured to:
display a plurality of data visualizations of metrics of module and course progress of the learner on one or more interactive screens based on a plurality of answers collected through the first input interface, wherein the learner dashboard is configured to display:
a first circular graph indicating module progress;
a second circular graph indicating course progress;
a time-spent bar graph comparing time spent by a learner to other learners; and
an estimated time of completion.

16. The platform of claim 15, further comprising:
a refresh and review interface comprising each of:
a smart refresh module configured to provide a retake version of the learning module that omits any questions answered confidently and correctly upon first presentation to the learner in the learning module;
a full refresh module configured to provide a full retake of the learning module;
a review list comprising all questions, answers, and learning materials from the learning module.

17. The platform of claim 15, wherein the first input interface comprises a progress bar that fills in visual indicators of progress via a first marker indicating mastery, a second progress marker indicating uncertainty, and a third progress marker indicating misinformation.

18. The platform of claim 15, wherein the first input action causes a written description of the confidence to appear adjacent to the radio button.

19. The platform of claim 15, wherein the first input interface is configured to display visual prompts of an artificial-intelligence guidance system, wherein the prompts comprise written instructions or encouragement to a learner and appear in response to particular answer sequences.

20. The platform of claim 19, wherein the visual prompts of the artificial-intelligence guidance system instruct a learner to indicate the learner's confidence level accurately in response to an answer sequence indicating cheating.

* * * * *